(12) United States Patent
Muraoka

(10) Patent No.: US 10,897,299 B2
(45) Date of Patent: Jan. 19, 2021

(54) WIRELESS APPARATUS, WIRELESS COMMUNICATION METHOD, AND PROGRAM

(71) Applicant: NEC Corporation, Tokyo (JP)

(72) Inventor: Kazushi Muraoka, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 16/761,523

(22) PCT Filed: Nov. 8, 2018

(86) PCT No.: PCT/JP2018/041415
§ 371 (c)(1),
(2) Date: May 5, 2020

(87) PCT Pub. No.: WO2019/093398
PCT Pub. Date: May 16, 2019

(65) Prior Publication Data
US 2020/0266863 A1    Aug. 20, 2020

(30) Foreign Application Priority Data

Nov. 9, 2017  (JP) ................................ 2017-216825

(51) Int. Cl.
*H04B 7/02*   (2018.01)
*H04B 7/06*   (2006.01)
(Continued)

(52) U.S. Cl.
CPC ......... *H04B 7/0617* (2013.01); *H04B 7/0452* (2013.01); *H04B 7/0456* (2013.01);
(Continued)

(58) Field of Classification Search
CPC .. H04B 7/0617; H04B 17/309; H04B 7/0452; H04B 7/0456; H04L 5/0048;
(Continued)

(56) References Cited

U.S. PATENT DOCUMENTS 8,379,742 B2    2/2013  Pham et al.
9,014,149 B2    4/2015  Mochida
(Continued)

FOREIGN PATENT DOCUMENTS

JP    2011-512692 A    4/2011
JP    2013-168751 A    8/2013
(Continued)

OTHER PUBLICATIONS

International Search Report corresponding to PCT/JP2018/041415 dated Jan. 29, 2019, 2 pages.
(Continued)

*Primary Examiner* — Zewdu A Kassa
(74) *Attorney, Agent, or Firm* — Wilmer Cutler Pickering Hale and Dorr LLP

(57) ABSTRACT

A wireless apparatus multiplies, by a first weight corresponding to each of a plurality of beams, a received signal corresponding to a reference signal transmitted from each of wireless terminals, estimates a channel response associated with each of the beams, computes a predetermined metric for each combination of beams to be used, selects the beams to be used when performing signal detection with respect to a received signal into which radio signals transmitted from the wireless terminals are spatially multiplexed based on the predetermined metric, determines a second weight to be used for the signal detection and multiplies, by the second weight, the received signal into which radio signals transmitted from the wireless terminals are spatially multiplexed to perform the signal detection.

20 Claims, 12 Drawing Sheets

(51) Int. Cl.
| | |
|---|---|
| *H04L 5/00* | (2006.01) |
| *H04B 7/0456* | (2017.01) |
| *H04B 7/0452* | (2017.01) |
| *H04B 17/309* | (2015.01) |
| *H04L 25/02* | (2006.01) |
| *H04L 27/26* | (2006.01) |
| *H04W 28/04* | (2009.01) |

(52) U.S. Cl.
CPC ......... *H04B 17/309* (2015.01); *H04L 5/0048* (2013.01); *H04L 25/0204* (2013.01); *H04L 25/0224* (2013.01); *H04L 27/2613* (2013.01); *H04W 28/04* (2013.01)

(58) Field of Classification Search
CPC ............. H04L 25/0204; H04L 25/0224; H04L 27/2613; H04W 28/04
USPC .................. 375/267, 260, 259, 316, 219
See application file for complete search history.

(56) References Cited

U.S. PATENT DOCUMENTS

| | | | |
|---|---|---|---|
| 10,084,521 | B2 | 9/2018 | Ko et al. |
| 2010/0178884 | A1* | 7/2010 | Nassiri-Toussi ..... H04B 7/0851 455/101 |
| 2010/0329379 | A1 | 12/2010 | Pham et al. |
| 2012/0243503 | A1 | 9/2012 | Mochida |
| 2016/0241323 | A1 | 8/2016 | Ko et al. |
| 2016/0261325 | A1 | 9/2016 | Ko et al. |

FOREIGN PATENT DOCUMENTS

| | | |
|---|---|---|
| JP | 2016-539541 A | 12/2016 |
| WO | WO-2009/096601 A1 | 8/2009 |
| WO | WO-2011/090028 A1 | 7/2011 |
| WO | WO-2017/037861 A1 | 3/2017 |

OTHER PUBLICATIONS

Yoshioka, Shohei et. al, Performance Evaluation of 5G Low-SHF-Band Massive MIMO with Digital Beamforming Using Two-Stage Channel Estimation, IEICE Technical Report, RCS2016-238, Jan. 12, 2017, vo l. 116, No. 396, pp. 13-18.

Yoshioka, Shohei et al., 5G SHF Massive MIMO—A Study of Channel Estimation of 5G Low-SHF-Band Massive MIMO with Digital Beamforming—(Review of a channel estimation for 5G low SHF band Massive MIMO digital BF method), Proceedings of the 2017 general conference of IEICE: Communication, Mar. 7, 2017, p. 432.

Shikida, Jun et al, Performance Evaluation of Beam Space Channel Estimation for Massive MIMO Systems—(Characteristic Evaluation of Beam Spatial Channel Estimation in Super Multi-Element Antenna System), Lecture proceedings 1 of the 2017 communication society conference of IEICE, Aug. 29, 2017, p. 290.

Suyama, Satoshi et. al, SHF 5G Massive MIMO Current Status of Studies on 5G Localized and Distributed Massive MIMO Techniques in Low SHF Band—(Review status of Low SHF band 5G concentrated/distributed arrangement Massive MIMO technology), Lecture proceedings 1 of the 2017 communication society conference of IEICE, Aug. 29, 2017, pp. s-16 and s-17.

* cited by examiner

WIRELESS APPARATUS, WIRELESS COMMUNICATION METHOD, AND PROGRAM

CROSS-REFERENCE TO RELATED APPLICATIONS

This application is a national stage application of International Application No. PCT/JP2018/041415 entitled "WIRELESS APPARATUS, WIRELESS COMMUNICATION METHOD, AND PROGRAM," filed on Nov. 8, 2018, which claims the benefit of the priority of Japanese Patent Application No. 2017-216825 filed on Nov. 9, 2017, the disclosures of each of which are hereby incorporated by reference in their entirety.

The present invention relates to a wireless apparatus, a wireless communication method, and a program.

BACKGROUND

A wireless apparatus such as a base station for a cellular phone or a wireless LAN (Local Area Network) access point in recent years often includes a plurality of antennas in order to implement high-speed communication. As one of transmission technologies using a plurality of antennas as mentioned above, a technology referred to as beamforming is present. The beamforming is configured to control directivity of a plurality of antennas as a whole by adjusting an amplitude and a phase of a transmitted signal or a received signal of an individual antenna.

There are analog beamforming and digital beamforming in the beamforming. In the analog beamforming, an amplitude and a phase of a signal of a radio frequency band are adjusted, using an amplifier and a phase shifter. In the digital beamforming, an amplitude and a phase of a base band signal are adjusted, using multiplication by a weight (or a weight coefficient).

A wireless apparatus such as a base station uses the digital beamforming, for example, thereby enabling implementation of multi-user MIMO (Multiple Input Multiple Output) transmission configured to perform spatial multiplexing of signals of a plurality of terminals (wireless terminals).

Patent Literature 1 discloses a method of generating a reception weight used in a base station when uplink multi-user MIMO is employed. At the base station, by using the reception weight generated according to a Minimum Mean Square Error (MMSE) criterion, for example, signal detection for separating, from signals of a plurality of terminals spatially multiplexed, a signal of an individual terminal, is performed. On this occasion, a received signal received by an individual antenna of the base station is used for the signal detection. The received signal includes thermal noise generated at a low noise amplifier connected to an individual antenna.

Non Patent Literature 1 discloses a method for uplink channel estimation using reference signals transmitted in an uplink, the method directed to massive MIMO (Massive MIMO) transmission where a base station includes a massive-element antenna. More specifically, the base station applies a plurality of fixed weights provided in advance to received signals of individual antennas to form a plurality of beams associated with the fixed weights. The base station receives reference signals from respective terminals by using the plurality of beams, and selects, among the plurality of beams, a beam with good reception quality. That is, the base station excludes a beam with a higher ratio of a thermal noise component and a lower signal to noise ratio (Signal to Noise Ratio) as compared with a reference signal component. With this arrangement, the base station obtains a channel response with estimation accuracy better than in a case where the fixed beams are not used.

[PTL 1] International Publication No. WO2011/090028
[NPL 1] Shouhei Yoshioka et al., "Performance Evaluation of 5G Low-SHF-BAND Massive MIMO with Digital Beamforming Using Two-Stage Channel Estimation", IEICE Technical Report, RCS2016-238, January 2017

SUMMARY

Analyses of the related arts will be given below.

As disclosed in Non Patent Literature 1, in massive MIMO uplink transmission, when a reference signal is transmitted from an individual terminal to the base station, reception is performed using a fixed beam matching an incoming direction of the reference signal from an individual terminal, thus enabling improvement of a reception level.

However, in the multi-user MIMO transmission where data signals that are transmitted from individual terminals (wireless terminals) are spatially multiplexed, it becomes necessary for a wireless apparatus such as a base station to simultaneously receive radio signals having different incoming directions from a plurality of wireless terminals.

In this case, when a wireless apparatus such as a base station by using all fixed beams provided in advance, a radio signal from any incoming direction can be received.

In the wireless apparatus such as a base station, however, thermal noise included in an individual fixed beam will affect a signal detection. Therefore, reception quality improvement cannot be expected.

If a wireless apparatus such as a base station performs reception using the fixed beam having a high reception level for a certain wireless terminal, the fixed beam may correspond to the fixed beam having a low reception level for a different wireless terminal.

If a wireless apparatus such as a base station selects the fixed beam as mentioned above (fixed beam whose reception level is high for a certain wireless terminal(s) but is low for different wireless terminals) and performs signal detection of the signals, a thermal noise component cannot be reduced, so that a final reception quality may be reduced, as a result.

Accordingly, the present invention has been devised in view of the above-mentioned issues. An object of the present invention is to provide a wireless apparatus, a wireless communication method, and a program, each improving reception quality of transmission from a plurality of wireless terminals to the wireless apparatus, such as uplink multi-user MIMO transmission.

According to a first aspect of the present invention, there is provided a wireless apparatus comprising: a first weight multiplication part that includes a first weight corresponding to an individual one of a plurality of beams and generates a signal obtained by multiplying, by the first weight, a received signal corresponding to a reference signal transmitted from each of a plurality of wireless terminals; a channel estimation part that estimates, a channel response associated with an individual one of the plurality of beams, for each of the plurality of wireless terminals, by using the signal obtained by the multiplication by the first weight; a metric computation part that computes a predetermined metric for each combination of beams to be used, by using the channel response estimated for each wireless terminal with respect to the plurality of wireless terminals; a beam selection part that selects beams to be used for signal detection of a received signal into which radio signals respectively transmitted from the plurality of wireless terminals are spatially multiplexed, based on the predetermined metric; a second weight generation part configured to determine a second weight to be used for the signal detection, by using the channel response associated with each of the selected beams; and a signal detection part configured to perform the signal detection by multiplying, by the second weight, the received signal into which into which radio signals respectively transmitted from the plurality of wireless terminals are spatially multiplexed.

According to a second aspect of the present invention, there is provided a wireless communication method comprising:

including a first weight corresponding to each of a plurality of beams and multiplying, by the first weight, a received signal corresponding to a reference signal transmitted from each of a plurality of wireless terminals; estimating a channel response associated with each of the plurality of beams, for each of the plurality of wireless terminals, by using the signal obtained by the multiplication by the first weight;

computing a predetermined metric for each combination of beams to be used, by using the channel response estimated for each wireless terminal with respect to the plurality of wireless terminals;

selecting beams to be used for signal detection of a received signal into which radio signals respectively transmitted from the plurality of wireless terminals are spatially multiplexed, based on the predetermined metric;

determining a second weight to be used for the signal detection, by using the channel response associated with each of the selected beams; and performing the signal detection by multiplying, by the second weight, the received signal into which into which radio signals respectively transmitted from the plurality of wireless terminals are spatially multiplexed.

According to a third aspect of the present invention, there is provided a program causing a computer to execute processing comprising:

including a first weight corresponding to each of a plurality of beams and multiplying, by the first weight, a received signal corresponding to a reference signal transmitted from each of a plurality of wireless terminals;

estimating a channel response associated with each of the plurality of beams, for each of the plurality of wireless terminals, by using the signal obtained by the multiplication by the first weight;

computing a predetermined metric for each combination of beams to be used, by using the channel response estimated for each wireless terminal with respect to the plurality of wireless terminals;

selecting beams to be used for signal detection of a received signal into which radio signals respectively transmitted from the plurality of wireless terminals are spatially multiplexed, based on the predetermined metric;

determining a second weight to be used for the signal detection, by using the channel response associated with each of the selected beams; and performing the signal detection by multiplying, by the second weight, the received signal into which into which radio signals respectively transmitted from the plurality of wireless terminals are spatially multiplexed.

According to the present invention, there is provided a non-transient computer-readable medium (storage medium such as a semiconductor memory, etc., a RAM (Random Access Memory), a ROM (Read Only Memory), or an EEPROM (Electrically Erasable Programmable Read-Only Memory), an HDDD (Hard Disk Drive), a CD (Compact Disc), or a DVD (Digital Versatile Disc)) on which the program according to the third aspect is recorded.

According to the present invention, there are provided a wireless apparatus, a wireless communication method, and a program that enables contribution to improvement in reception quality of transmissions from a plurality of wireless terminals to a wireless apparatus, such as uplink multi-user MIMO transmission.

DETAILED DESCRIPTION

Figure 1:
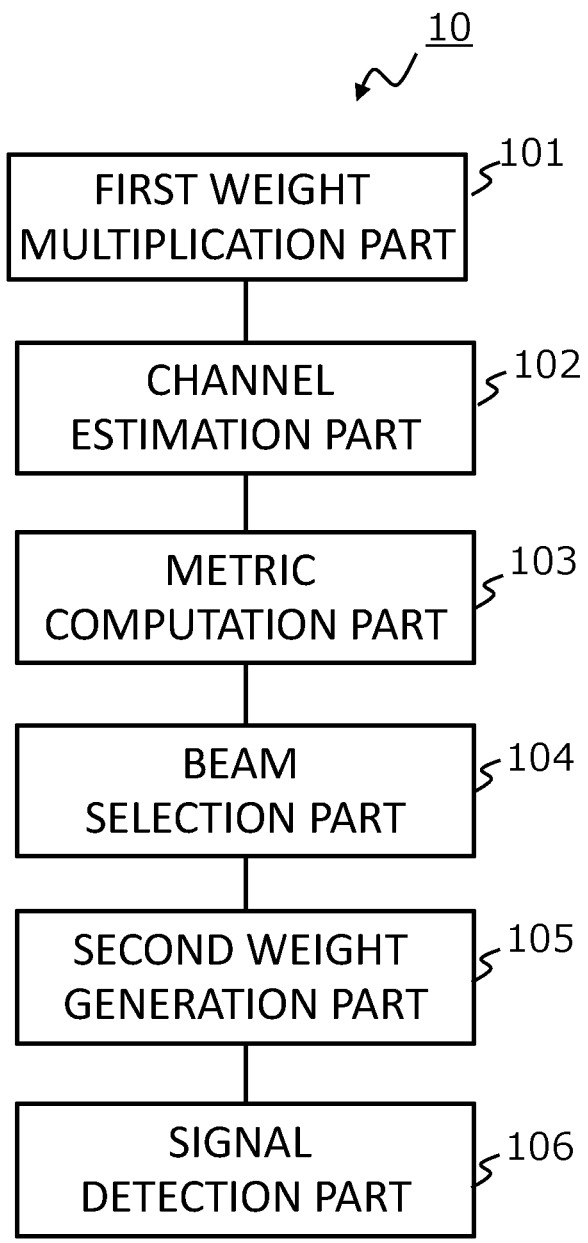
FIG. 1 is a diagram for explaining an overview of an exemplary embodiment.

First, an overview of example embodiments will be described. A reference numeral in each drawing appended to this overview is given to each element for convenience as an example for helping understanding and the description of this overview does not intend to impose any limitation. Further, connection lines between blocks in the respective drawings include both bidirectional and unidirectional connection lines. An one-way arrow schematically indicates the flow of a main signal (data), and it does not exclude bidirectionality.

Referring to FIG. 1, a wireless apparatus 10 according to the example embodiment includes a first weight multiplication part 101, a channel estimation part 102, a metric computation part 103, a beam selection part 104, a second weight generation part 105, and a signal detection part 106.

The first weight multiplication part 101 includes a first weight corresponding to each of a plurality of beams and multiplies, by the first weight, a radio signal corresponding to a reference signal transmitted from each wireless terminal (not shown).

The channel estimation part 102 estimates a channel response associated with each of the plurality of beams, using the signal multiplied by the first weight.

The metric computation part 103 computes metrics each corresponding to each combination of the beams to be selected, using channel responses associated with radio signals of the wireless terminals that are transmitted through spatial multiplexing. Herein, as an individual metric, a value is used which corresponds to reception quality when performing signal detection of the radio signals corresponding to data signals of the wireless terminals transmitted through the spatial multiplexing.

The beam selection part 104 selects a beam to be used for receiving the radio signal corresponding to the data signal of the wireless terminal, based on the metric that has been selected.

The second weight generation part 105 generates a second weight to be applied to a received signal corresponding to the data signal transmitted from the wireless terminal, using the channel response associated with each selected beam.

The signal detection part 106 performs the signal detection with respect to the received signal associated with the selected beam, using the second weight.

The wireless apparatus 10 computes each of the metrics for each combination of the beams associated with the radio signals of the plurality of wireless terminals that are transmitted through spatial multiplexing. Herein, the wireless apparatus 10 sets a value corresponding reception quality as each metric. This can improve the reception quality when performing signal detection of radio signals of a plurality of wireless terminals when a combination of beams having a large metric is selected. Accordingly, by excluding a beam that does not contribute to improvement in reception quality, reduction of thermal noise (internal noise) can be expected in the wireless apparatus 10 more than a case where every beam provided in advance is used.

In contrast, with respect to a beam whose reception level is high for a certain wireless terminal but whose reception level is low for a different wireless terminal, influence of the beam on the reception quality can be determined, based on the metric.

According to the above-mentioned example embodiment, an appropriate beam that contributes to improvement in reception quality can be selected, so that the reception quality of uplink multi-user MIMO transmission can be improved.

Figure 2:
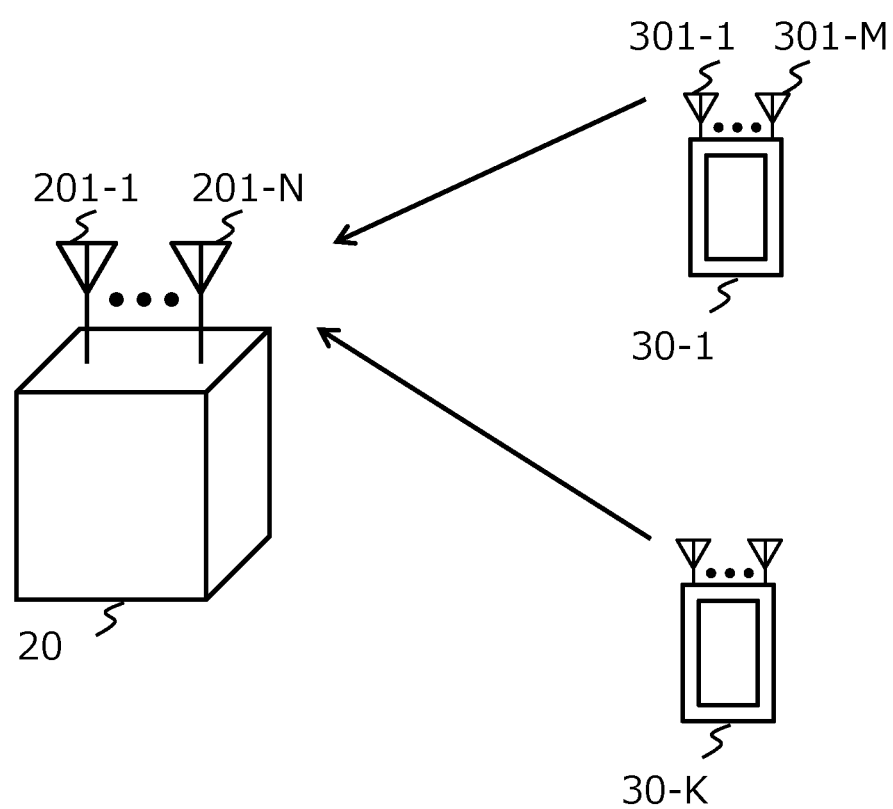
FIG. 2 is a diagram illustrating a schematic configuration of a wireless communication system according to a first exemplary embodiment.

The following describes example embodiments in further detail with reference to the drawings. A same reference numeral is given to a same component in each example embodiment, with a description of the same component omitted First Example Embodiment A first example embodiment will be described in more detail, using the drawings. FIG. 2 is a diagram illustrating a schematic configuration of a wireless communication system according to the first example embodiment. Referring to FIG. 2, a wireless communication system 1 includes a wireless apparatus 20 and terminals 30-1 to 30-K (where K is a positive integer; the same shall apply hereinafter). Unless there is any particular reason for making a distinction among the terminals 30-1 to 30-K in the following description, a branch number will not be given to a reference number for each of the terminals 30-1 to 30-K, and the terminals 30-1 to 30-K will be denoted just as "terminals 30". Each of the terminals 30 is a wireless terminal configured to perform wireless communication with the wireless apparatus 20 (The terminal 30 corresponds to the wireless terminal which has been referred to in the description of FIG. 1. The terminal 30 may be also termed as a wireless terminal 30).

It is noted that K in the terminals 30-1 to 30-K in the wireless communication system 1 is not less than 1, and at least one or more terminals 30 are therefore present. Alternatively, a relay apparatus including a relay function may be included in the wireless communication system, in place of a terminal 30.

The wireless apparatus 20 is a base station or an access point and includes a plurality of antennas 201-1 to 201-N (where N is an integer not less than 2, the same shall apply hereinafter). Each terminal 30 includes a plurality of antennas 301-1 to 301-M (where M is an integer not less than 2, for example, the same shall apply hereinafter).

Unless there is any particular reason for making a distinction among the antennas 201-1 to 201-N in the following description, the antennas 201-1 to 201-N will be denoted just as "antennas 201". Similarly, unless there is any particular reason for making a distinction among the antennas 301-1 to 301-M, the antennas 301-1 to 301-M will be denoted just as "antennas 301".

Though the terminals 30 each including the plural antennas 301 are illustrated in FIG. 2, each terminal does not need to include plural antennas 301. It may be so configured that each terminal 30 includes at least one or more antennas (a case where M=1 is also included in the antennas 301-1 to 301-M). Further, though FIG. 2 illustrates a case where each terminal 30 includes M antennas 301, the number of the antennas included in individual terminals 30 may also be different.

Figure 3:
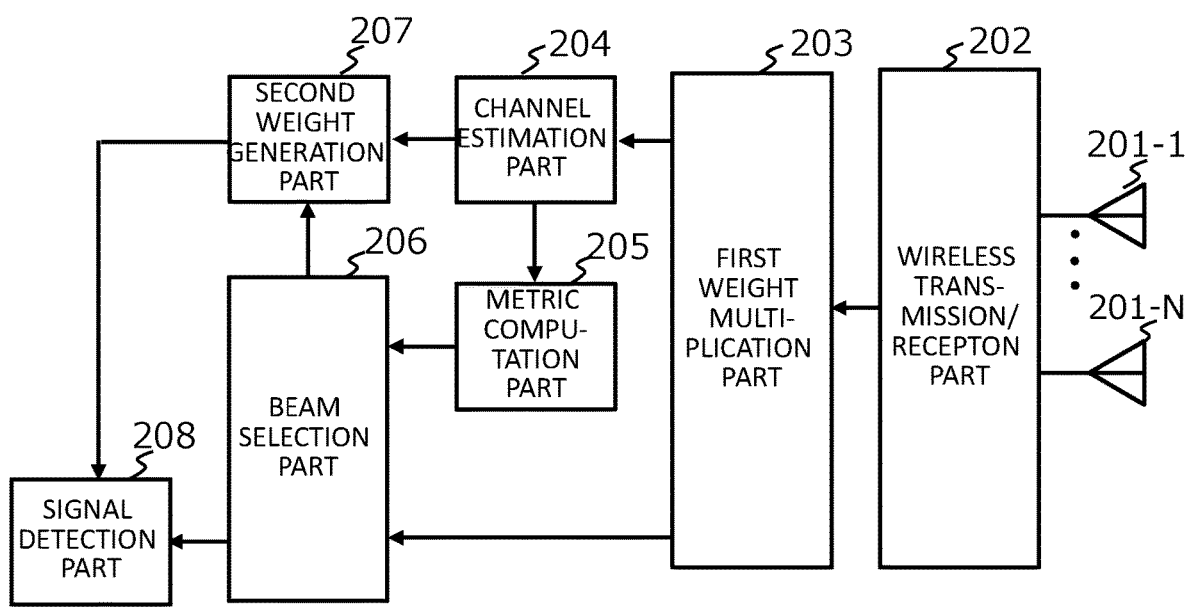
FIG. 3 is diagram illustrating an example of an arrangement of a wireless apparatus according to the first exemplary embodiment.

FIG. 3 illustrates an example of an arrangement of the wireless apparatus 20 in FIG. 2. Referring to FIG. 3, the wireless apparatus 20 includes antennas 201, a wireless transmission/reception part 202, a first weight multiplication part 203, a channel estimation part 204, a metric computation part 205, a beam selection part 206, a second weight generation part 207, and a signal detection part 208.

The antennas 201 receive radio signals transmitted by the terminals 30, and output the received signals to the wireless transmission/reception part 202. The radio signal received may be either a reference signal or a data signal.

It is assumed that the reference signal that is transmitted by each of the terminals 30 is known in the wireless apparatus 20 (that an agreement with respect to the reference signal that is transmitted/received is present between the wireless apparatus 20 and each terminal 30). An antenna including a planar array configuration with antenna elements arranged in horizontal and vertical directions, for example, can be used as the antennas 201.

The wireless transmission/reception part 202 converts the radio signal (received signal) obtained from each antenna 201 into a baseband signal and then outputs the baseband signal to the first weight multiplication part 203. Processing modules configured to perform processing such as timing detection, CP (Cyclic Prefix) removal, Fast Fourier Transform (FFT), and so forth are provided between the wireless transmission/reception part 202 and the first weight multiplication part 203, depending on a wireless communication scheme. Since these processing (processing modules themselves) are not directly related to the subject of the present application, known modules can be implemented, and arrangement and processing of the known modules are clear for a man skilled in the art, these processing modules will not be illustrated in the drawing, and descriptions thereof will be herein omitted.

The first weight multiplication part 203 includes a first weight corresponding to each of a plurality of beams (the first weight is stored in advance in a storage apparatus (such as a semiconductor memory), a register, or the like not shown).

The first weight multiplication part 203 multiplies the baseband signal obtained from the wireless transmission/reception part 202 by the first weight corresponding to each of the plurality of beams.

Then, the first weight multiplication part 203 delivers, among the signal associated with each beam, and subjected to multiplication by the first weight, the signal corresponding to the reference signal to the channel estimation part 204, and delivers each signal corresponding to the data signal to the beam selection part 206.

The channel estimation part 204 estimates a channel response associated with each of the plurality of beams, using the signal corresponding to the reference signal subjected to the multiplication by the first weight.

More specifically, the channel estimation part 204 estimates the channel response associated with each beam, based on the reference signal and the signal (signal multiplied by the first weight) obtained from the first weight multiplication part 203.

Then, the channel estimation part 204 delivers the estimation value of the channel response to the metric computation part 205 and the second weight generation part 207.

The metric computation part 205 computes each of metrics for each combination of the beams to be selected, using a predetermined computation method. The method of computing the metric will be described later.

It is assumed that each metric is a value corresponding to reception quality when detecting radio signals of plural wireless terminals that are spatially multiplexed. It is assumed herein that the number of wireless terminals to be spatially multiplexed is K, and wireless terminals are specified by a MAC (Media Access Control) scheduler not illustrated (the wireless terminals that are to transmit data using uplink shared data channels are selected).

The metric computation unit 205 outputs each of the metrics for each combination of the beams to the beam selection unit 206.

The beam selection part 206 receives, from the metric computation part 205, each of the metrics for each combination of the beams. The beam selection part 206 receives, from the first weight multiplication part 203, each data signal multiplied by the first weight, as an input.

First, the beam selection part 206 outputs, to the second weight generation part 207, the combination of the beams corresponding to the metric that assumes a maximum value among the metrics supplied from the metric computation part 205.

The beam selection part 206 also delivers, to the signal detection part 208, the data signals that are included in the combination of the beams where the metric assumes the maximum value, for example, among each data signal delivered from the first weight multiplication part 203 and multiplied by the first weight.

The second weight generation part 207 generates a second weight, using the channel responses associated with the combination of the beams received from the beam selection part 206. The second weight generation part 207 outputs the generated second weight to the signal detection part 208.

The signal detection part 208 receives the second part output from the second weight generation part 207. The signal detection part 208 perform signal detection by multiplying each signal delivered from the beam selection part 206, by the second weight.

The signal detection part 208 delivers a result of the signal detection to a decoder not illustrated. Processing in a higher layer not illustrated is executed for a result of decoding by the decoder. The processing after the signal detection is not directly related to the subject of the present application and this processing is clear for the man skilled in the art. Therefore, an illustration and a description of the processing will be omitted.

Figure 4:
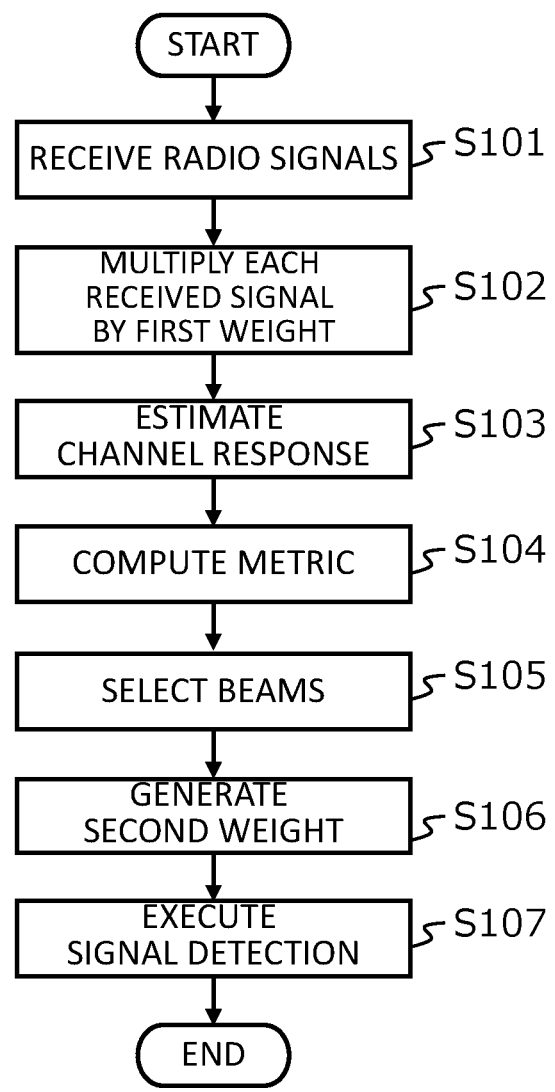
FIG. 4 is a flowchart illustrating an example of operations of the wireless apparatus according to the first exemplary embodiment.

Subsequently, operations of the wireless apparatus 20 according to the first example embodiment described with reference to FIG. 3 will be described. FIG. 4 is a flowchart illustrating an example of the operations of the wireless apparatus 20 according to the first example embodiment.

In step S101, the antennas 201 receive radio signals including data signals and reference signals transmitted from the terminals 30. Then, the radio signals are supplied to the wireless transmission/reception part 202 and are then converted to baseband signals.

In step S102, the first weight multiplication part 203 multiplies the baseband signals obtained from the wireless transmission/reception part 202 by a first weight corresponding to each of a plurality of beams. More specifically, when an N-dimensional received signal vector (baseband received signal vector) whose components are N signals received by N antennas 201 of the wireless apparatus 20 is set to y and an N-dimensional first weight vector corresponding to a b-th beam ($1 \leq b \leq B$) in B beams is set to $a_b$, the multiplication process in step S102 is expressed by the following expression (1):

$$a_b^H y \qquad (1)$$

The superscript H in Expression (1) is an Hermitian transpose (where a complex conjugate of each component of a matrix is taken, and the matrix is transposed: also termed as a transpose conjugate (transpose conjugate)). When an N-dimensional row vector $a^H b$ is regarded as a 1×N matrix and an N-dimensional column vector y is regarded as an N×1 matrix, an operation result in Expression (1) is a 1×1 scalar value where products of corresponding elements in the respective vectors are summed, and is also termed as an inner product.

The processing of Expression (1) is performed for each of the B beams (the processing of Expression (1) is executed for b=1, B). That is, a B-dimensional received signal vector $\tilde{y}$ subjected to multiplication by the first weight is obtained by the following Expression (2):

$$\tilde{y} = A^H y \qquad (2)$$

where the matrix A is an N×B matrix that includes N-dimensional first weight vectors $a_1$ to $a_B$ for the B beams. The matrix A is defined by the following Expression (3):

$$A = (a_1 \ldots a_B) \tilde{y} \qquad (3)$$

Figure 11A:
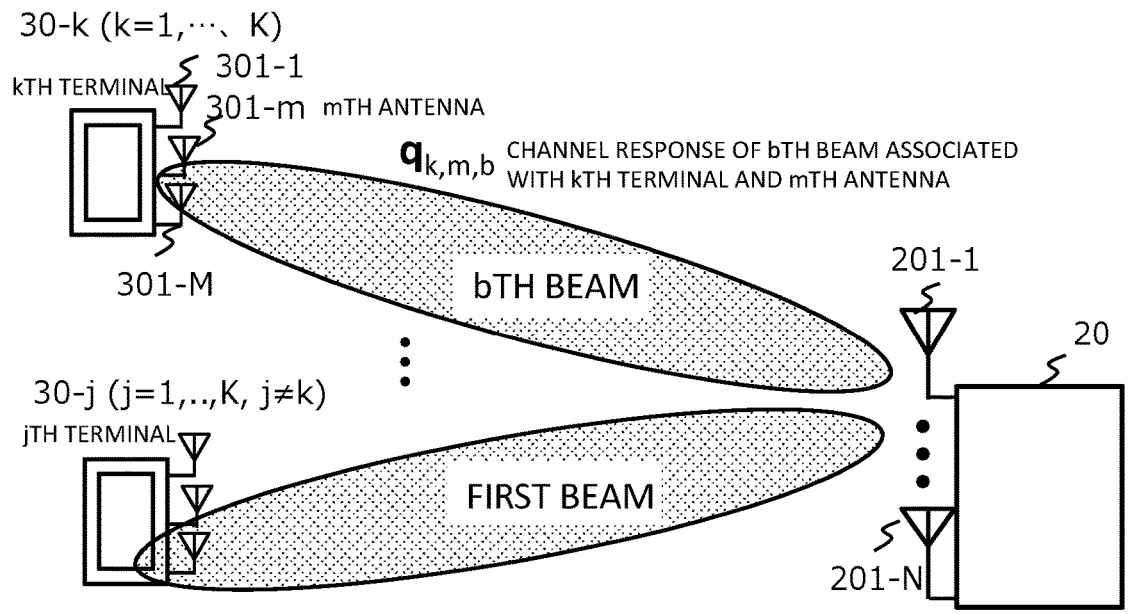
FIG. 11A is a diagram describing the exemplary embodiment.
Figure 11B:
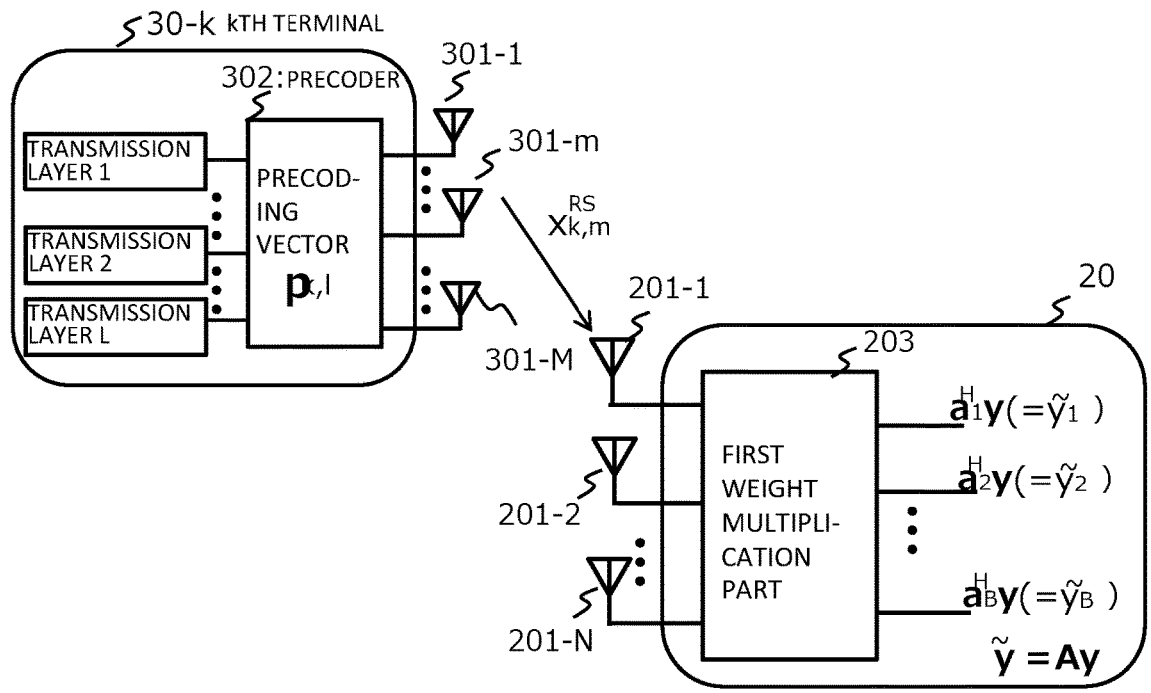
FIG. 11B is a diagram describing the exemplary embodiment.

FIG. 11B is a diagram schematically illustrating the above Expressions (1) and (2) in the first weight multiplication part 203 of the wireless apparatus 20. The operation of Expression (2) is multiplication of a B×N matrix (transpose conjugate of the N×B matrix A) and the N-dimensional received signal vector y (N×1 matrix). A vector $\tilde{y}$, which is a result of the multiplication, is a B×1 matrix (or a B-dimensional column vector). B outputs of the first multiplication part 203 in the wireless apparatus 20 in FIG. 11B correspond to respective components $\tilde{y}_1$ to $\tilde{y}_B$ of the B dimensional received signal vector $\tilde{y}$.

Details of the first weight will be described later.

In step S103 in FIG. 4, the channel estimation part 204 estimates a channel response associated with each of the B beams, using the signal after the multiplication by the first weight and the reference signal.

Specifically, when the reference signal transmitted from an mth antenna 301-$m$ of a kth terminal 30-$k$ (in FIG. 11B) among K terminals 30 is expressed as $x^{RS}_{k,m}$, a channel response $q_{k,m,b}$ of the b-th beam to the m-th antenna 301-$m$ of the k-th terminal 30-$k$ is estimated by the following Expression (4).

$$q_{k,m,b} = \frac{(x^{RS}_{k,m})^*}{|x^{RS}_{k,m}|^2} \cdot a_b^H y \quad (4)$$

where the superscript * denotes a complex conjugate, and ‖ denotes a norm. By removing components of the reference signal (known signal) transmitted from the received reference signal $a^H_b y$, the channel response is obtained. In Expression (4), by multiplying the received reference signal $a^H_b y$ by the complex conjugate $(x^{RS}_{k,m})^*$ of the reference signal (known signal) $x^{RS}_{k,m}$ and dividing the resulting signal by the square of the norm of the reference signal (known signal) $x^{RS}_{k,m}$, the components of the reference signal are removed, and the channel response is thereby obtained. FIG. 11A schematically illustrates the mth antenna 301-$m$ of the kth terminal 30-$k$, the b-th beam, the wireless apparatus 20, the channel response $q_{k,m,b}$, and so on.

A channel estimation method other than Expression (4) may be used in this example embodiment. Processing such as weighting averaging in a frequency direction or a time direction may be performed for obtaining the estimation value of the channel response.

Further, step S102 and step S103 in FIG. 2 may be interchanged. That is, after a channel response associated with each antenna has been estimated, the value of the estimation may be multiplied by the first weight, and then the channel response associated with each beam may be determined.

In step 104, the metric computation part 205 computes a metric for each combination of the beams to be selected, using a predetermined computation method. It is assumed herein that each metric is a value corresponding to reception quality when detecting the radio signals of the plural wireless terminals that are spatially multiplexed.

When B' (where B' is assumed to a positive integer not more than B) beams are selected among B beams, a B×B' beam selection matrix U is defined by the following expression (5):

$$U = (u_{n(1)} \ldots u_{n(B')}) \quad (5)$$

where n(b') represents a beam number for the beam to be selected b'-th, and it is assumed that, with respect to b'≠b", n(b')≠n(b").

A vector $u_i$ is a B-dimensional unit vector whose only i-th element is 1 and the other elements are 0, and is defined by the following expression (6):

$$u_i = (0, \ldots, 0, 1, 0, \ldots 0)^T \quad (6)$$

where T is a transpose operator.

By multiplying the B-dimensional received signal vector $\tilde{y}$ subjected to the multiplication by the first weight, by a B×B' matrix $U^H$ obtained by performing complex conjugate and transpose operation of the B×B' beam selection matrix U, as indicated by the following equation (7), a B'-dimensional received signal vector $\tilde{y}'$ after the beam selection is obtained.

$$\tilde{y}' = U^H \tilde{y} \quad (7)$$

A Signal to Interference plus Noise Ratio (SINR) $\gamma_{k,l}(U)$ (=desired signal power/(interference signal power+noise power)) is given by the following Expression (8). The SINR is a SINR at a first transmission layer of the k-th terminal, with the B'-dimensional received signal vector $\tilde{y}'$ after the beam selection, subjected to multiplication by a weight $w_{k,l}$ which is obtained by the MMSE criterion, a ZF (Zero Forcing) criterion, or the like. A numerator in Expression (8) corresponds to a desired signal power component, while a denominator in Expression (8) corresponds to the sum of an interference terminal power component and a noise power component.

$$\gamma_{k,l}(U) = \frac{w_{k,l}^H U^H Q_k p_{k,l}}{1 - w_{k,l}^H U^H Q_k p_{k,l}} \quad (8)$$

It is assumed herein that the terminal 30 performs spatial multiplexing transmission of the total of L transmission layers (where L is a positive integer not more than M), using M antennas.

$p_{k,l}$ is an M-dimensional precoding vector for the l-th transmission layer (l=1, ..., L) of the k-th terminal. FIG. 11B schematically illustrates transmission layers 1 to L of the kth terminal 30-$k$ in FIG. 11A, and the precoding vector $p_{k,l}$ that is used in a precoder 302.

$Q_k$ is a (B×M)-dimensional channel matrix where a channel response $q_{k,m,b}$ to the k-th terminal after the multiplication by the first weight (in Expression (4)) is set to (b, m) element (1≤b≤B, 1≤m≤M).

$w_{k,l}$ is a B'-dimensional weight vector (weight vector corresponding to the k-th terminal and the l-th transmission layer) that is obtained by the MMSE criterion or the like. $Q_k p_{k,l}$ in the numerator of $w_{k,l}^H U^H Q_k p_{k,l}$ in Expression (8) can be made to correspond to the received signals (B-dimensional received signal vector) that were precoded by the M-dimensional precoding vector $p_{k,l}$ at the k-th terminal, transmitted through the M antennas, and received by beams each corresponding to the l-th weight in the wireless apparatus 20 via the wireless transmission paths (the (B×M) dimensional channel matrix $Q_k$ that is estimated based on the channel response of the k-th terminal after the multiplication by the first weight includes beams of the wireless transmission paths and the wireless apparatus 20). $U^H Q_k p_{k,l}$ corresponds to a B'-dimensional signal obtained by an operation of multiplying this B-dimensional received vector by a transpose conjugate $U^H$ of the B×B' beam selection matrix U and then performing the beam selection. By multiplying this signal by an Hermitian transpose $w_{k,l}^H$ of the B'-dimensional weight vector $w_{k,l}$ that is obtained by the MMSE criterion, the desired signal power component for the k-th terminal is obtained.

As indicated by Expression (8), the estimation value of SINR depends on the beam selection matrix U.

The following describes specific metrics each using SINR of Expression (8) (but not limited to the following).

Specific Example 1

First, a minimum SINR $\gamma_{k,l}(U)$ among SINRs of all the L transmission layers of all the K terminals is used as a first metric. A transmission layer is a unit of a signal sequence which can be spatial multiplexed by a MIMO terminal. Modulated symbols are allocated to plural transmission layers of the terminal by layer mapping.

$$M_1(U) = \min_{(k,l)} \gamma_{k,l}(U) \quad (9)$$

($1 \leq k \leq K$, $1 \leq l \leq L$)

Use of the beam selection matrix U that maximizes this metric can select beams that can improve SINR of the transmission layer which is the lowest among SINRs of all the L transmission layers of all the K terminals.

Specific Example 2

A second metric assumes that a modulation scheme and a coding rate (MCS, Modulation and Coding Schemes) $MCS_{k,l}$ of the first transmission layer of the k-th terminal are given from a MAC scheduler (not illustrated) in the higher layer. In this case, a difference between $\gamma_{BLER}(MCS_{k,l})$ that is an SINR which can satisfy a predetermined Block Error Rate (BLER) (e.g., 0.1 or 0.01) and an SINR $\gamma_{k,l}(U)$ of the first transmission layer of the k-th terminal is set to the metric. This metric is expressed by the following Expression (10):

$$M_2(U) = \min_{(k,l)} [\gamma_{k,l}(U)/\gamma_{BLER}(MCS_{k,l})] \quad (10)$$

The metric in the above Expression (10) is set to a value obtained by division of the SINR because it is assumed that a true value is used for the value of each SINR. When decibel (dB) notation (logarithmic notation) of each SINR is adopted, a difference value between the $\gamma_{k,l}(U)$ and the $\gamma_{BLER}(MCS_{k,l})$ is used. Use of the beam selection matrix U that maximizes this metric can select beams that can improve SINR of the transmission layer where a block error is most likely to occur, with even the modulation scheme and the coding rate for each transmission layer taken into consideration.

Specific Example 3

In a third metric, a total sum of instantaneous transmission rates of all the L transmission layers of each of the K terminals is set to the metric, by using a function r( ) which, using an SINR as an argument, converts the SINR to an instantaneous transmission rate. The metric is expressed by the following Expression (11).

$$M_3(U) = \sum_{k=1}^{K} \sum_{l=1}^{L} r(\gamma_{k,l}(U)) \quad (11)$$

Use of the beam selection matrix U that maximizes this metric can select beams that maximize a total value of instantaneous transmission rates of all the L transmission layers of each of the K terminals.

Specific Example 4

A fourth metric is based on a proportional fairness (PF: Proportional Fairness) criterion, and is set to be expressed by the following Expression (12):

$$M_4(U) = \sum_{k=1}^{K} \frac{\sum_{l=1}^{L} r(\gamma_{k,l}(U))}{R_k} \quad (12)$$

where $R_k$ is a moving average throughput of the total of all the L transmission layers of the k-th terminal. r( ) is a function that converts SINR to an instantaneous transmission rate, with the SINR as an argument.

In a PR criterion, a value obtained by dividing a total value of instantaneous throughputs in the L transmission layer of each wireless terminal by the moving average throughput is set to a metric for each wireless terminal, and the total value of metrics for all the K terminals is used as a final metric.

Use of the beam selection matrix U that maximizes this metric allows beam selection to be performed so that the terminal and the transmission layer having an instantaneous throughput larger than the moving average throughput is prioritized.

Specific Example 5

A fifth metric is the one that can be computed with a less computation amount, is based on a value obtained by totaling received power from each of the wireless terminals for each beam, and is expressed by the following Expression (13):

$$M_5(U) = U\left\{-\sigma^2 e + \sum_{k=1}^{K} \sum_{m=1}^{M} g_{k,m}\right\} \quad (13)$$

where $g_{k,m}$ is a B-dimensional received power vector including the square value of the channel response as an element, e is a B-dimensional vector whose elements are all 1, and the $g_{k,m}$ and the e are respectively defined by the following expressions (14) and (15):

$$g_{k,m} = (|q_{k,m,1}|^2, \ldots, |q_{k,m,B}|^2) \quad (14)$$

$$e = (1, \ldots, 1, \ldots, 1)^T$$

$\sigma^2$ is assumed to be a coefficient that is proportional to noise power which is included in each reception antenna.

With respect to a vector computed within a bracket on a right side in Expression (13), an element of a beam number that contributes to improvement in a reception quality, assumes a positive value, while an element of a beam number that does not contribute to improvement in a reception quality assumes a negative value, which is accordingly equivalent to determine as to whether to select the beam according to the sign of the element of the vector computed within the bracket. Use of this metric can determine the beam that is effective for the improvement in the reception quality without performing computation the weight $w_{k,l}$.

In step S105 in FIG. 4, the beam selection part 206 selects the beam that maximize one of the above-mentioned metrics.

Herein, the beam selection matrix U for extracting the selected beams is sent to the second weight generation part 207. Further, the B'-dimensional received signal vector after the beam selection is sent to the signal detection part 208, using the same beam selection matrix U by Expression (7).

In step S106 in FIG. 4, the second weight generation part 207 computes a second weight for the B'-dimensional received signal vector after the beam selection according to the MMSE criterion or the like.

This second weight is the same as the B'-dimensional weight vector $w_{k,l}$ that has been obtained in the course of determining the beam selection matrix U in step S104 in FIG. 4. Therefore, the weight that has been obtained in step S104 can be reused.

In step S107 in FIG. 4, the signal detection part 208 performs signal detection by multiplying the B'-dimensional received signal vector after the beam selection by the second weight.

Next, details of the first weight will be described. It is assumed in the first example embodiment that positions at which the terminals 30 are present with the wireless apparatus 20 as a reference, are limited to a specific region. Under such a constraint, it is possible to grasp directions where radio waves will arrive, to a certain degree. It is assumed in the first example embodiment that the first weight is selected under the above-mentioned condition, and details of the first weight will be described below.

As the first weight, a weight that is in a mutually orthogonal relationship between two arbitrary beams, for example, is used. That is, the first weight is orthogonal between the arbitrary two beams among the plurality of beams. Specifically, a weight that makes the following Expression (16) hold with respect to arbitrary beam numbers b1 and b2 (b1≠b2) is used:

$$a_{b1}{}^H a_{b2} = 0 \qquad (16)$$

The above expression (16) corresponds to an inner product between a first weight vector $a_{b1}$ of the beam number b1 and a first weight vector $a_{b2}$ of the beam number b2, being zero. When the weight that makes the orthogonal relationship to hold as mentioned above is used as the first weight, a wide range can be covered by a small number of the beams.

As the weight whereby the beams are mutually orthogonal, a DFT (Discrete Fourier Transform) matrix, for example, is used. That is, the DFT matrix can be used as the first weight.

An element d(k, l) (k, l=1, . . . , n) of an n-dimensional DFT matrix D is, for example, given by:

$$d(k, l) = \frac{1}{\sqrt{n}} \exp\left(j\frac{2\pi kl}{n}\right)$$

$$j^2 = -1.$$

When the antennas 201 include a planar array arrangement ($N=N_x \times N_z$) having $N_x$ elements in a horizontal direction and $N_z$ elements in a vertical direction, the Kronecker product between DFT matrices in the respective horizontal and vertical directions is used. An N-dimensional first weight vector $a_b$ of the b-th beam in that case is expressed by the following expressions (17) and (18):

$$a_b{}^T = [a_b(0,0), \ldots, a_b(0,N_z-1), a_b(1,0), \ldots, a_b(N_x-1, N_z-1)] \qquad (17)$$

$$a_b(n_x, n_z) = \frac{1}{\sqrt{N_x N_z}} \exp\left\{j\frac{2\pi}{N_x N_z}[n_x N_z i_x(b) + n_z N_x i_z(b)]\right\} \qquad (18)$$

where $i_x(b)$ is a beam number not less than 0 and less than $N_x$ in the horizontal direction of the b-th beam, while $i_z(b)$ is a beam number not less than 0 and less than $N_z$ in the vertical direction of the b-th beam.

It is so arranged that combinations of the $i_x(b)$ and the $i_z(b)$ do not overwrap among the B beams.

When the antennas 201 include a planar array where the antenna elements are arranged in the horizontal direction and the vertical direction as mentioned above, the Kronecker product between the DFT (Discrete Fourier Transform) matrix in the horizontal direction and the DFT matrix in the vertical direction can be used.

Values of the $i_x(b)$ and the $i_z(b)$ may be set according to the position of the terminal 30, for example. By doing so, beams are directed to a direction where arrival of a transmitted signal by the terminal 30 is expected. Thus, channel estimation accuracy can be improved. Alternatively, it may be so arranged that a received power is measured for each beam and the values of $i_x(b)$ and the $i_z(b)$ having the received power that is statistically large are selected.

The weight in Expression (18) can be expressed in a generalized form as the following Expression (19):

$$a_b(n_x, n_z) = \frac{1}{\sqrt{N_x N_z}} \exp \qquad (19)$$

$$\left\{j\frac{2\pi}{N_x N_z}[n_x N_z i_x(b) + n_z N_x i_z(b)] + j\frac{2\pi}{\lambda}(n_x d_x \sin\theta\cos\varphi + n_z d_z \cos\theta)\right\}$$

In the above expression, $\lambda$ is a wavelength, and $d_x$ and $d_z$ are respectively an antenna element interval in the horizontal direction and an antenna element interval in the vertical direction. $\varphi$ and $\theta$ are respectively an azimuth angle and a zenith angle of a main robe of a reference beam (beam where $i_x(b)=i_x(b)=0$).

That is, when Expression (18) is used, each of the azimuth angle and the zenith angle of the main robe of the reference beam is 90 degrees. When Expression (19) is used, the main robe of the reference beam can be set in an arbitrary direction.

As another example of the first weight, an arbitrary weight may be employed, using a plurality of DFT matrices that are mutually different. To take an example, when the number of the DFT matrices in the horizontal direction and the number of the DFT matrices in the vertical direction are respectively set to $F_x$ and $F_z$, or when a total of $F_x F_z$ DFT matrices are used, the first weight is expressed by replacing Expression (18) by the following Expression (20):

$$a_b(n_x, n_z) = \frac{1}{\sqrt{N_x N_z}} \exp\left\{j\frac{2\pi n_x i_x(b)}{F_x N_x} + j\frac{2\pi n_z i_z(b)}{F_z N_z}\right\} \qquad (20)$$

where $i_x(b)$ is not less than 0 and less than $F_x N_x$, and $i_z(b)$ is not less than 0 and less than $F_z N_z$. The beam whose reminder when the $i_x(b)$ has been divided by the $F_x$ is $f_x$ corresponds to a $f_x$th DFT matrix in the horizontal direction. The same applies to the vertical direction, too.

As another example of the first weight, a weight configured to steer a main robe to a specific direction is used. The N-dimensional first weight vector $a_b$ of the b-th beam configured to steer a main robe to an azimuth angle $\phi_b$ and a zenith angle $\theta_b$ is expressed by Expression (17) and the following Expression (21):

$$a_b(n_x, n_z) = \frac{1}{\sqrt{N_x N_z}} \exp\left[ j\frac{2\pi}{\lambda}(n_x d_x \sin\theta_b \cos\varphi_b + n_z d_z \cos\theta_b) \right] \quad (21)$$

where values of $\phi_b$ and $\theta_b$ may be set according to the position of the terminal 30, for example. Alternatively, it may be so arranged that received signal power is measured and a direction having the received power that is statistically large is selected.

When the antennas 201 include a planar array arrangement for 2 polarized waves (N=Nx×Nz×2), beam formation may be performed independently for each polarized wave.

When it is assumed herein that elements of the N-dimensional first weight vector $a_b$ are arranged in the order of Nx×Nz weights of a first polarized wave and in the order of Nx×Nz weights of a second polarized wave. Then, when the b-th beam corresponds to the first polarized wave, the N-dimensional first weight vector $a_b$ of the b-th beam is expressed by the following Expression (22):

$$a_b^T = [a_b(0,0), \ldots, a_b(0,N_z-1), a_b(1,0), \ldots, a_b(N_x-1, N_z-1), 0, \ldots, 0] \quad (22)$$

On the other hand, when the b-th beam corresponds to the second beam, the N-dimensional first weight vector $a_b$ of the b-th beam is expressed by the following Expression (23):

$$a_b^T = [0, \ldots, 0, a_b(0,0) \ldots, a_b(0,N_z-1), a_b(1,0), \ldots, a_b(N_x-1, N_z-1)] \quad (23)$$

As described above, according to the first example embodiment, the wireless apparatus 20 computes, for the K wireless terminals whereby transmission is performed through spatial multiplexing, each of the metrics for each combination of the beams. As described above, the metric is determined based on one of the followings, for example:

a minimum SINR value $M_1(U)$ after multiplication by the second weight;

a difference value $M_2(U)$ between SINR necessary for achieving a given modulation scheme and coding rate by using a predetermined block error rate and SINR after multiplication by the second weight;

a total value $M_3(U)$ of instantaneous rates;

a total value $M_4(U)$ of PF metrics; and a total value $M_5(U)$ of received powers from all wireless terminals for each of individual beams.

By selecting beams that maximize one of these metrics $M_1(U)$ to $M_4(U)$, the beams that contribute to improvement in a reception quality can be selected. Further, beams that increases thermal noise without contributing improvement in the reception quality can be excluded. Based on the above-mentioned metric $M_5(U)$, beams that are effective for improvement in a reception quality can be determined without performing computation the second weight. Therefore, a reception quality of uplink multi-user MIMO transmission from a plurality of wireless terminals to the wireless apparatus can be improved. In this example embodiment, the first weight multiplication part 203 receives baseband signals output from the wireless transmission/reception part 202. But, since processing of the first weight multiplication part 203 can be performed on an analog signal(s) as well, the function same as that of the first weight multiplication part 203 may be implemented as an analog circuit.

Second Example Embodiment

Next, a second example embodiment will be described in detail with reference to the drawings. In the first example embodiment, by selecting appropriate beams, a thermal noise that is not necessary at a time of signal detection is suppressed, whereas it is an object of the second example embodiment to reduce influence of a thermal noise that is not necessary at a time of channel estimation.

Figure 5:
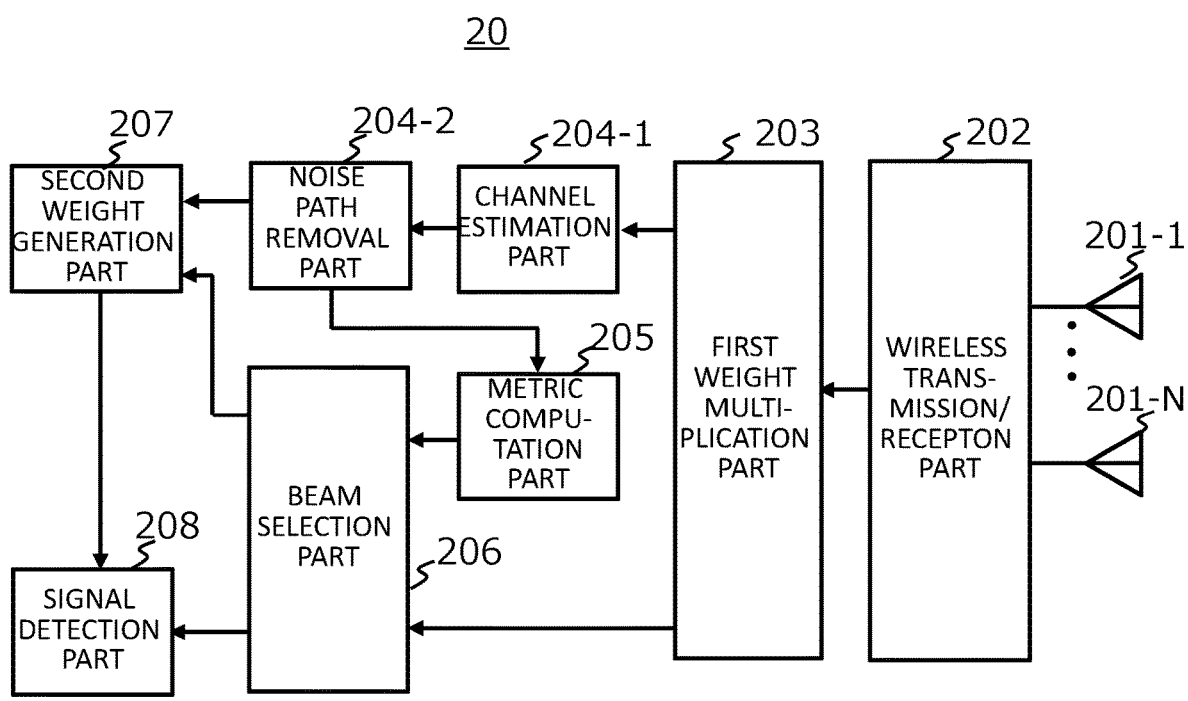
FIG. 5 is a diagram illustrating an example of an arrangement of a wireless apparatus according to a second exemplary embodiment.

FIG. 5 illustrates a wireless apparatus 20 in the second example embodiment. Descriptions of blocks that are the same as those of the wireless apparatus 20 in FIG. 3 will be omitted.

A channel estimation part 204-1 estimates a channel response for each beam, using a radio signal corresponding to a reference signal, like the channel estimation part 204 in FIG. 3. A difference from the channel estimation part 204 in FIG. 3 is an output destination of the channel response. The channel estimation part 204-1 in FIG. 5 outputs the estimated channel response to a noise path removal part 204-2.

The noise path removal part 204-2 determines that, as for a beam for which the power level of the received channel response is equal to or less than a predetermined threshold value, a noise component is dominant, and substitutes zero (corresponding to inclusion of no signal) for the channel response to update the channel response.

On the other hand, if the power level is not less than the threshold value, the noise path removal part 204-2 determines that the reference signal is dominant and uses the channel response supplied from the channel estimation part 204-1 without alteration. The channel response that has been updated as mentioned above is used as each of inputs to a metric computation part 205 and a second weight generation part 207.

Figure 6:
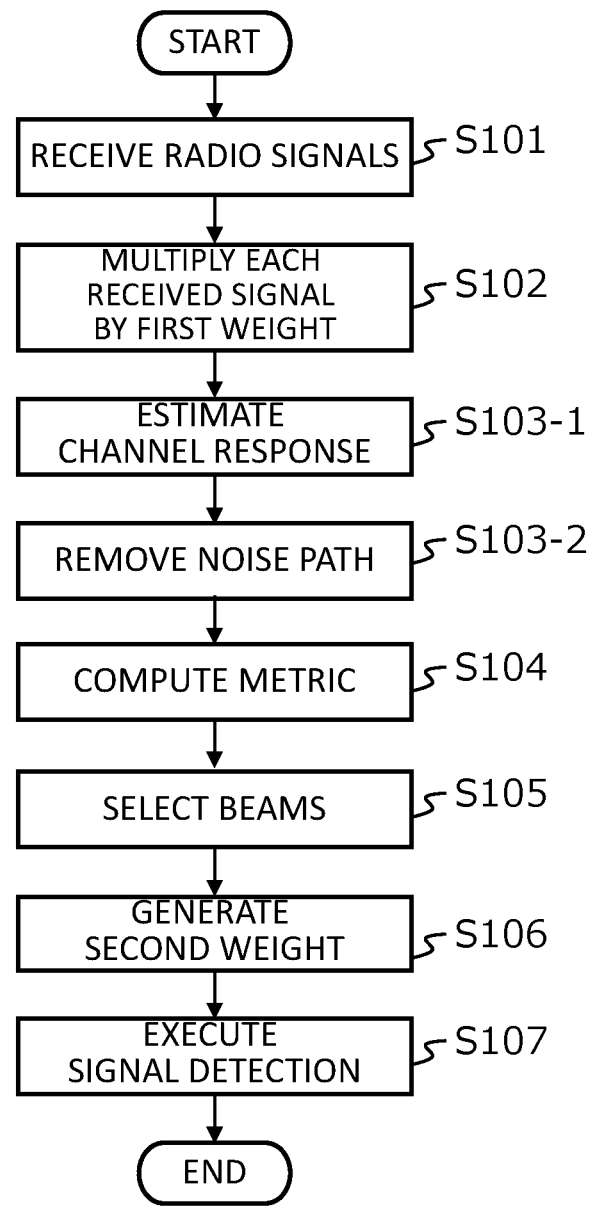
FIG. 6 is a flowchart illustrating an example of operations of the wireless apparatus according to the second exemplary embodiment.

FIG. 6 is a flowchart illustrating an example of operations of the wireless apparatus 20 according to the second example embodiment. Hereinafter, only operations that are different from those in the flowchart in FIG. 4 will be described.

In step S103-1 in FIG. 6, the channel estimation part 204-1 estimates a channel response for each beam, as in step S103 in FIG. 4. Note that noise path removal is performed for the estimated channel response by the noise path removal part 204-2 in a subsequent step S103-2, which is different from step S103 in FIG. 4.

In step S103-2, the noise path removal part 204-2 determines that, in the beam where the power level of the channel response received from the channel estimation part 204-1 is equal to or less than a predetermined threshold value, a noise component is dominant, and substitutes zero for the channel response, thereby updating the channel response. On the other hand, if the power level is not less than the threshold value, the noise path removal part 204-2 determines that a reference signal is dominant and adopts the channel response that has been received. Computation of metrics in step S104 and generation of a second weight in step S106 are performed by using the channel response that has been updated as mentioned above.

As described above, the second example embodiment has features such that after the wireless apparatus 20 has performed channel estimation for each beam, noise path removal is performed. By performing the noise path removal, influence of a thermal noise which is included at a time of channel estimation can be reduced, metric computation accuracy can be improved, and the second weight can be obtained more accurately.

Third Example Embodiment

Next, a third example embodiment will be described in detail with reference to the drawings. In each of the first example embodiment and the second example embodiment, a single wireless apparatus corresponding to the base station performs reception processing. In the third example embodiment, a wireless apparatus is functionally divided into distributed units and a centralized control unit (center unit). Further, an arrangement termed as a Centralized-RAN (Radio Access Network) through which the centralized control unit is connected to the plural distributed units is assumed to be adopted.

Figure 7:
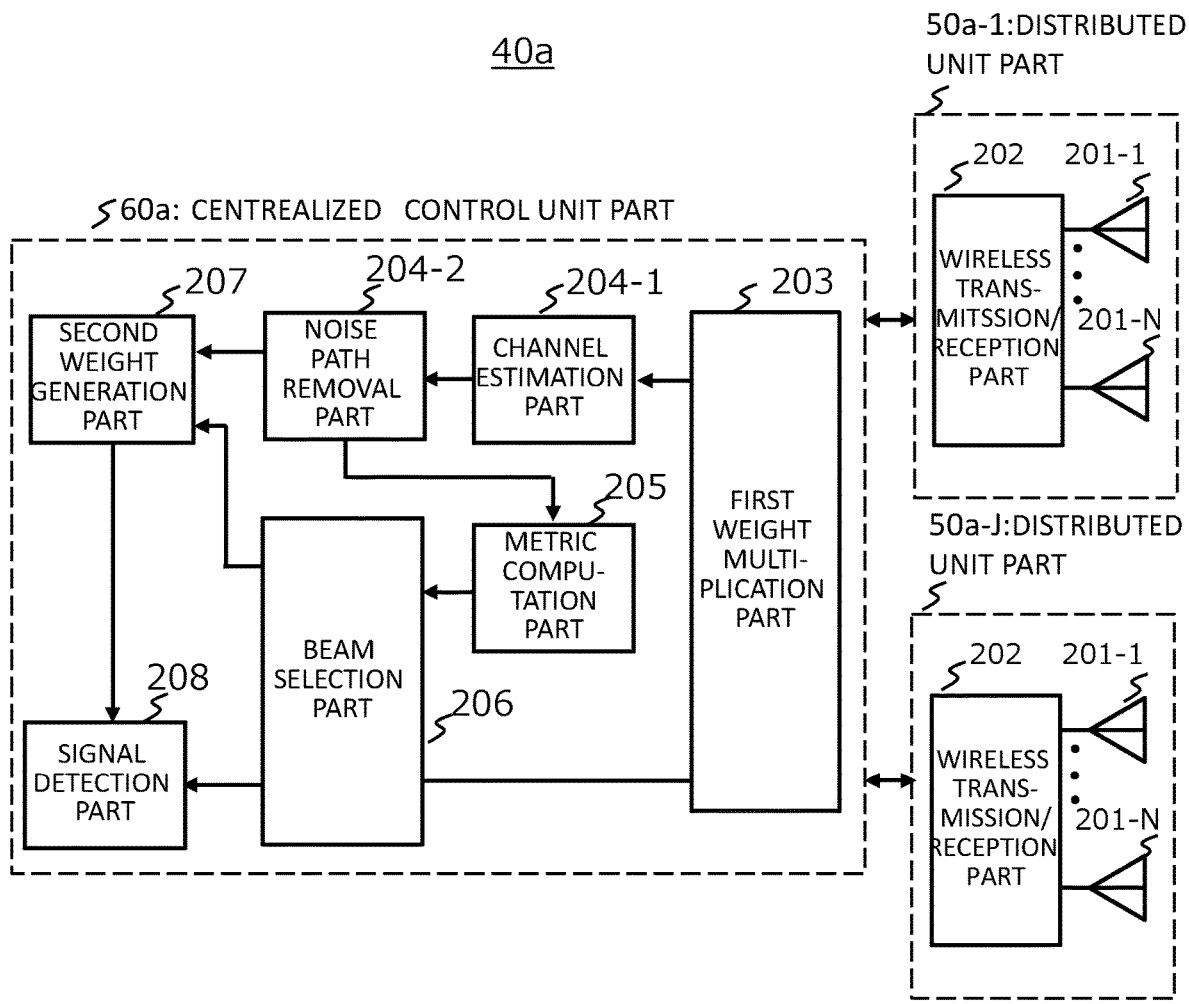
FIG. 7 is a diagram illustrating an example of an arrangement of a wireless apparatus according to a third exemplary embodiment.

FIG. 7 illustrates an example of an arrangement of a wireless apparatus 40a in the third example embodiment. Referring to FIG. 7, distributed unit parts 50a-1 to 50a-J (where J is an integer not less than 2) are respectively installed in different locations. It is assumed that the distributed unit parts 50a-1 to 50a-J are each connected to the centralized control unit part 60a through a network. A method for connection among these units may be performed via wires or wirelessly, and an arbitrary method may be adopted, such as CPRI (Common Public Radio Interface), Ethernet (registered trademark), etc., as an interface.

In the arrangement of the wireless apparatus 40a in FIG. 7, each distributed unit part 50a includes antennas 201 and a wireless transmission/reception part 202.

The centralized control unit part 60a includes a first weight multiplication part 203, a channel estimation part 204-1, a noise path removal part 204-2, a metric computation part 205, a beam selection part 206, a second weight generation part 207, and a signal detection part 208.

Since the antennas 201 and the wireless transmission/reception part 202 that are included in each of the distributed unit parts 50a-1 to 50a-J have similar functions to those in the second example embodiment, descriptions of the antennas 201 and the wireless transmission/reception part 202 will be omitted.

In the centralized control unit part 60a, a received signal is sent from the wireless transmission/reception part 202 of each of J distributed unit parts 50a-1 to 50a-J. The first weight multiplication part 203 independently multiplies, by a first weight, the received signal from each of the distributed unit parts 50a-1 to 50a-J. Likewise, the channel estimation part 204-1 and the noise path removal part 204-2 perform channel response estimation and noise path removal for each distributed unit part 50a.

The metric computation part 205 computes each of metrics for the J distributed unit parts 50a-1 to 50a-J. Specifically, the following Expressions (24) to (28) are used as the metrics, in place of Expressions (9) to (13).

$$M_1(U_1, \ldots, U_J) = \min_{(k,l)} \sum_{j=1}^{J} \gamma_{k,l}(U_j) \quad (24)$$

$$M_2(U_1, \ldots, U_J) = \min_{(k,l)} \left[ \left\{ \sum_{j=1}^{J} \gamma_{k,l}(U_j) \right\} \Big/ \gamma_{BLER}(MCS_{k,l}) \right] \quad (25)$$

$$M_3(U_1, \ldots, U_J) = \sum_{k=1}^{K} \sum_{l=1}^{L} \sum_{j=1}^{J} r(\gamma_{k,l}(U_j)) \quad (26)$$

$$M_4(U_1, \ldots, U_J) = \sum_{k=1}^{K} \frac{\sum_{l=1}^{L} \sum_{j=1}^{J} r(\gamma_{k,l}(U_j))}{R_k} \quad (27)$$

$$M_5(U_1, \ldots, U_J) = \sum_{j=1}^{J} U_j \left\{ -\sigma^2 e + \sum_{k=1}^{K} \sum_{m=1}^{M} g_{k,m} \right\} \quad (28)$$

where $U_j$ represents a beam selection matrix for a j-th distributed unit part 50a-j.

Expressions (24) and (25) respectively correspond to replacement of the SINR in Expression (9) by the total value of SINRs in the J distributed unit parts 50a-1 to 50a-J and replacement of the SINR in Expression (10) by the total value of the SINRs in the J distributed unit parts 50a-1 to 50a-J.

Expressions (26) and (27) respectively correspond to replacement of the instantaneous transmission rate in Expression (11) by the total value of instantaneous transmission rates of the J distributed unit parts 50a-1 to 50a-J and replacement of the instantaneous transmission rate in Expression (12) by the total value of the instantaneous transmission rates of the J distributed unit parts 50a-1 to 50a-J.

These metrics involving the J distributed unit parts 50a-1 to 50a-J are examples, and metric computation may be performed by regarding the whole received signals of the J distributed unit parts 50a-1 to 50a-J as one vector, for example.

Expression (28) corresponds to the one where the metric in Expression (13) has been totaled for the J distributed unit parts 50a-1 to 50a-J. Even if the beam selection matrix $U_j$ is determined for an individual distributed unit part 50a, the result of the computation of Expression (28) becomes equivalent only in the case of Expression (28).

The beam selection part 206 determines the beam selection matrix $U_j$ to be used for each of the distributed unit parts 50a, using one of the metrics in Expressions (24) to (28).

The second weight generation part 207 generates a second weight for each distributed unit part 50a, using the beam selection matrix $U_j$. Alternatively, it may be so arranged that the second weight generation part 207 regards the received signals of the J distributed unit parts 50a-1 to 50a-J as one vector to generate a second weight for the whole received signal vector.

The signal detection part 208 performs signal detection for each distributed unit part 50a, using the second weight for each distributed unit part 50a, and then synthesizes results of signal detections, thereby obtaining a final signal detection result. Alternatively, it may be so arranged that the signal detection part 208 regards the received signals of the J distributed unit parts 50a-1 to 50a-J as one vector, and performs the signal detection, using the second weight for the whole received signal vector.

As described above, according to the third example embodiment, the arrangement is assumed where the wireless apparatus is functionally divided into respective parts of distributed units and a centralized control unit, and the centralized control unit is connected to the plural distributed units. In this case, the centralized control unit computes each of metrics for beam selection for each combination of beams over the plural distributed units. By determining the beams as mentioned above, the beams that are aligned can be selected among the plural distributed units, and the beams that can improve a reception quality more can be selected. That is, compared with a case where beam selection is independently performed for each distributed unit, the reception quality can be improved.

Figure 8:
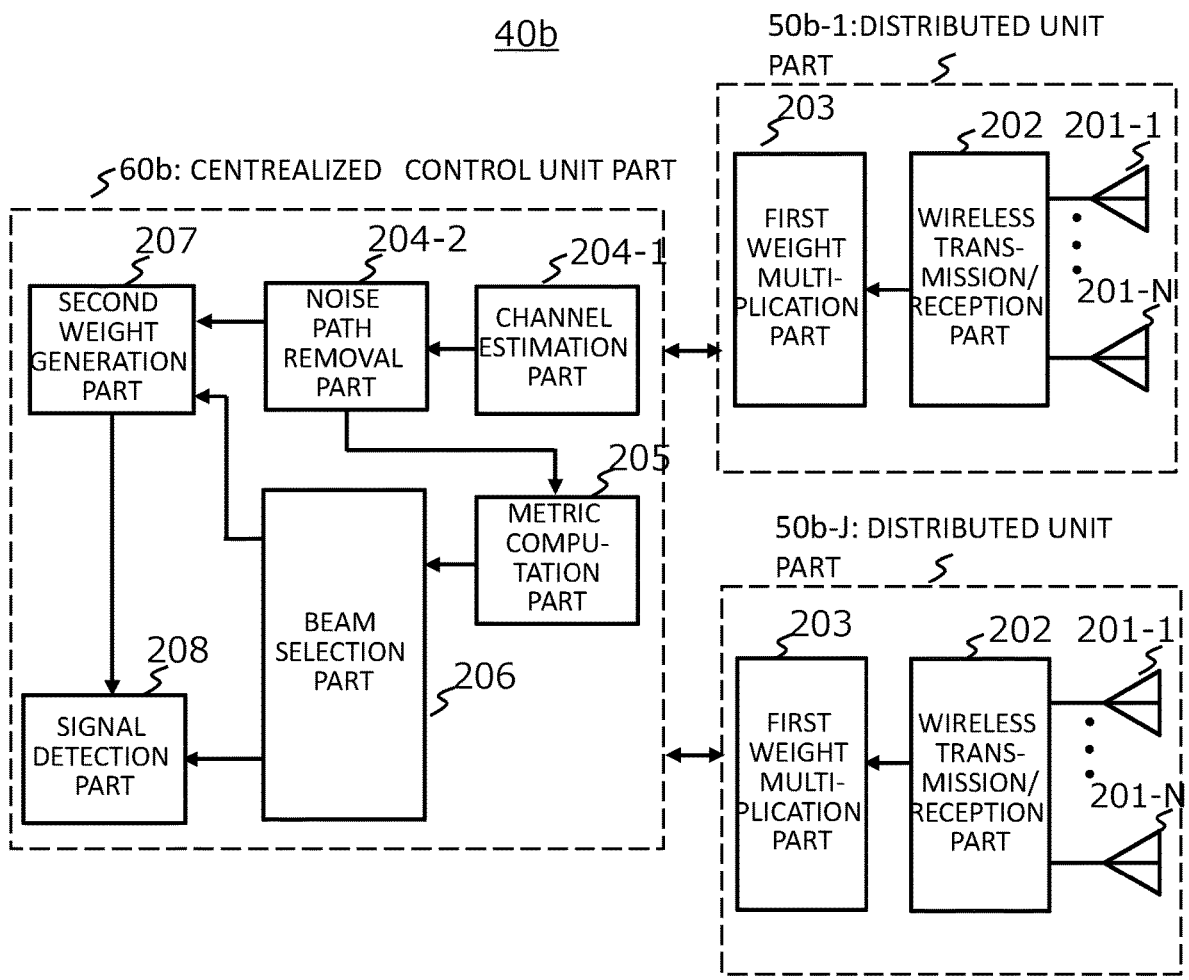
FIG. 8 is diagram illustrating an example of an arrangement of the wireless apparatus according to the third exemplary embodiment.
Figure 9:
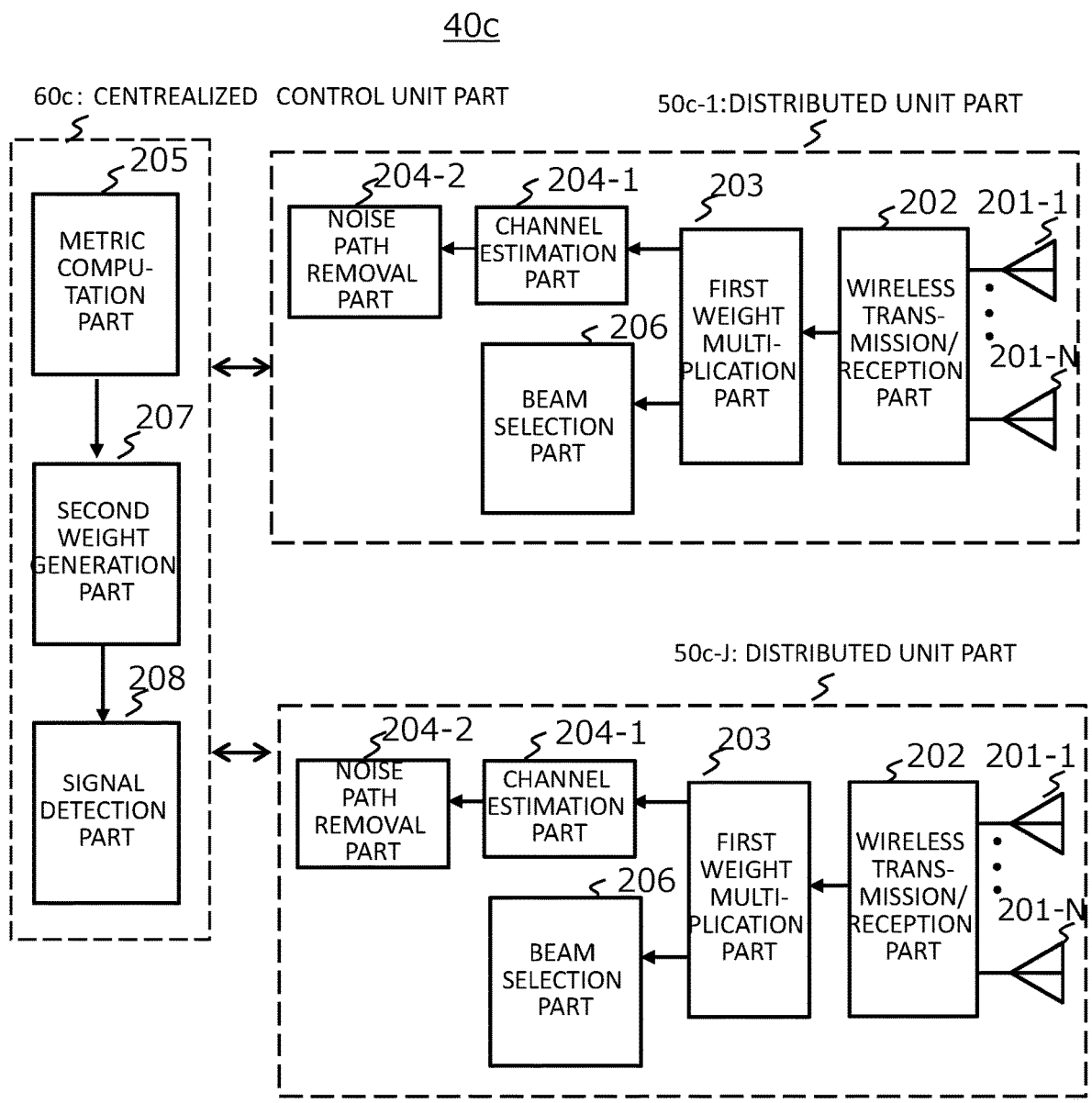
FIG. 9 is a diagram illustrating an example of an arrangement of the wireless apparatus according to the third exemplary embodiment.

FIG. 7 is an example for implementing the third example embodiment, and the third example embodiment is not limited to this arrangement. A similar result can be obtained even if the third example embodiment has an arrangement as illustrated in FIG. 8 or FIG. 9. In the arrangement of a wireless apparatus 40b in FIG. 8, each distributed unit part 50b includes the antennas 201, the wireless transmission/reception part 202, and the first weight multiplication part 203. A centralized control unit part 60b includes the channel estimation part 204-1, the noise path removal part 204-2, the metric computation part 205, the beam selection part 206, the second weight generation part 207, and the signal detection part 208. In the arrangement of a wireless apparatus 40c in FIG. 9, each distributed unit part 50c includes the antennas 201, the wireless transmission/reception part 202, the first weight multiplication part 203, the channel estimation part 204-1, the noise path removal part 204-2, and the beam selection part 206. As illustrated in FIG. 9, since a centralized control unit part 60c performs processing extending over a plurality of the distributed units 50c, it is necessary to dispose the metric computation part 205, the second weight generation part 207, and the signal detection part 208 in the centralized control unit part 60c.

Fourth Example Embodiment

Next, a fourth example embodiment will be described in detail with reference to the drawing. In each of the first example embodiment and the third example embodiment, each of metrics is computed for each combination of beams to be selected, and beams that can improve a reception quality at a time of signal selection are selected. In the fourth example embodiment, computation of each of metrics for each combination of beams is the same, but the fourth example embodiment is different in that a MAC schedular determines users (wireless terminals) to be spatially multiplexed, based on a result of metric computation (result of computation of each of metrics for each combination of beams).

Figure 10:
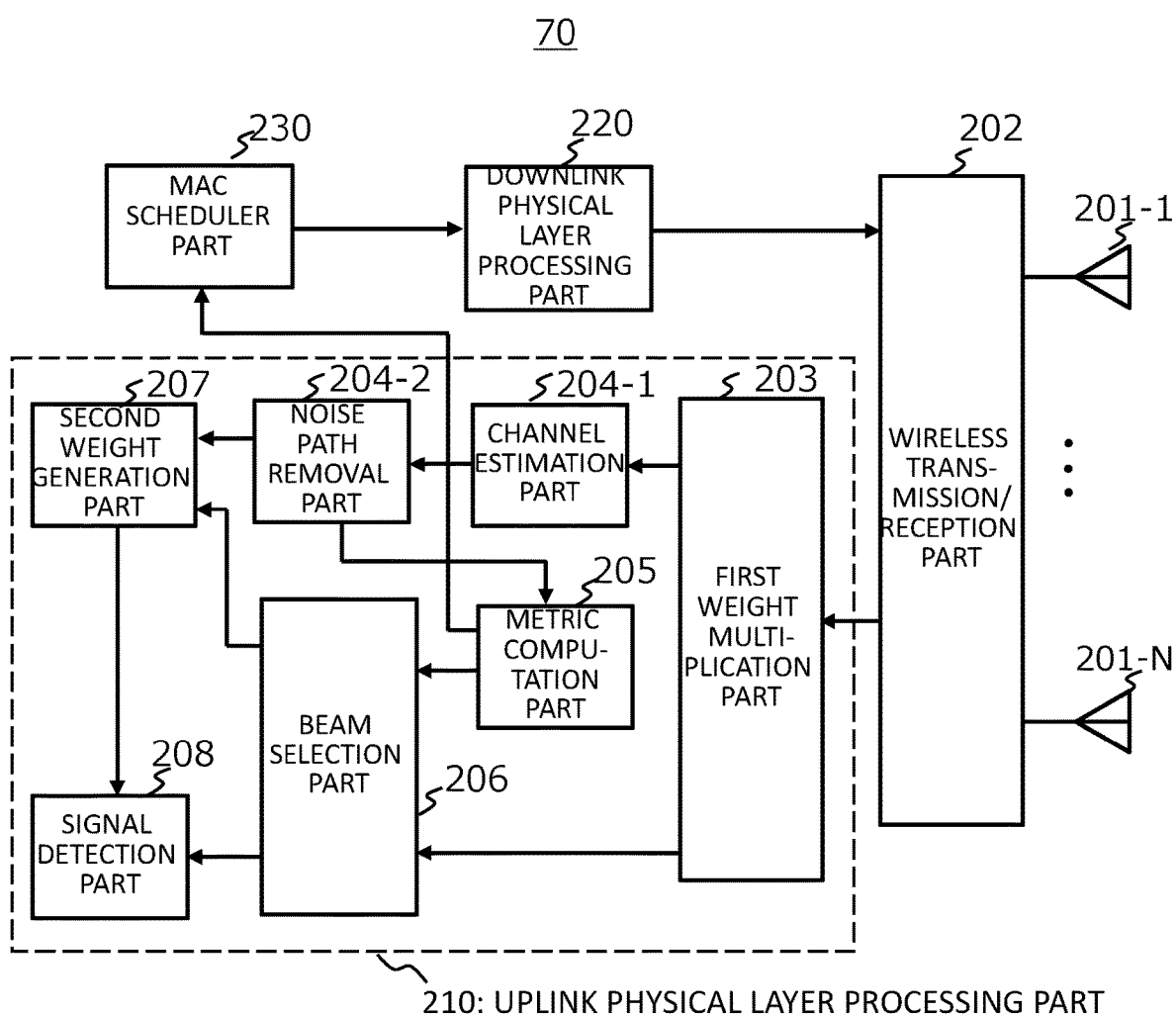
FIG. 10 is a diagram illustrating an example of an arrangement of a wireless apparatus according to a fourth exemplary embodiment.

FIG. 10 illustrates an example of an arrangement of a wireless apparatus 70 in the fourth example embodiment. The wireless apparatus 70 has an arrangement in which a downlink physical layer processing part 220 and a MAC (Media Access Control) schedular part 230 are added, in addition to the functional blocks of the wireless apparatus 20 in FIG. 5. That is, referring to FIG. 10, a first weight multiplication part 203, a channel estimation part 204-1, a noise path removal part 204-2, a metric computation part 205, a beam selection part 206, a second weight generation part 207, and a signal detection part 208 of an uplink physical layer processing part 210 respectively correspond to the arrangements of the parts 203-208 in FIG. 5. Hereinafter, only functions that are not included in those in FIG. 5 will be described. Though the wireless apparatus 70 is illustrated as the arrangement in which all the functions are accommodated within one apparatus, the wireless apparatus 70 may be divided into distributed unit parts and a centralized control unit part as in the third example embodiment.

The MAC schedular part 230 performs scheduling for allocating radio resources to each wireless terminal. In the scheduling, each of the metrics is computed for each combination of a plurality of the wireless terminals among the wireless terminals (e.g., 30 in FIG. 2) which are under control of the wireless apparatus 70 and for which uplink data transmission is necessary. As each metric, one of the metrics in Expression (9) to (13) is used. The MAC schedular part 230 adopts a combination of wireless terminals that maximizes the metric, for example.

The downlink physical layer processing part 220 transmits, to each wireless terminal (30 in FIG. 2), scheduling information supplied from the MAC schedular part 230, as control information. The downlink physical layer processing part 220 is in charge of performing downlink data signal transmission as well, which is not directly related to the present invention.

As described above, according to the fourth example embodiment, the wireless terminals for which the scheduling is to be performed are selected, based on a metric for each combination of beams.

Combination of beams that can improve transmission quality differs according to the wireless terminals (30 in FIG. 2) for which the scheduling is to be performed.

In the fourth example embodiment, by selecting, based on a metric for each combination of beams, a wireless terminal (s) for which the scheduling is to be performed, scheduling according to combinations of wireless terminals (30 in FIG. 2) and of beams, suitable for improving transmission quality, is enabled. Therefore, according to the fourth example embodiment, the transmission quality can be improved more than in scheduling that does not take into consideration combinations of beams.

Figure 12:
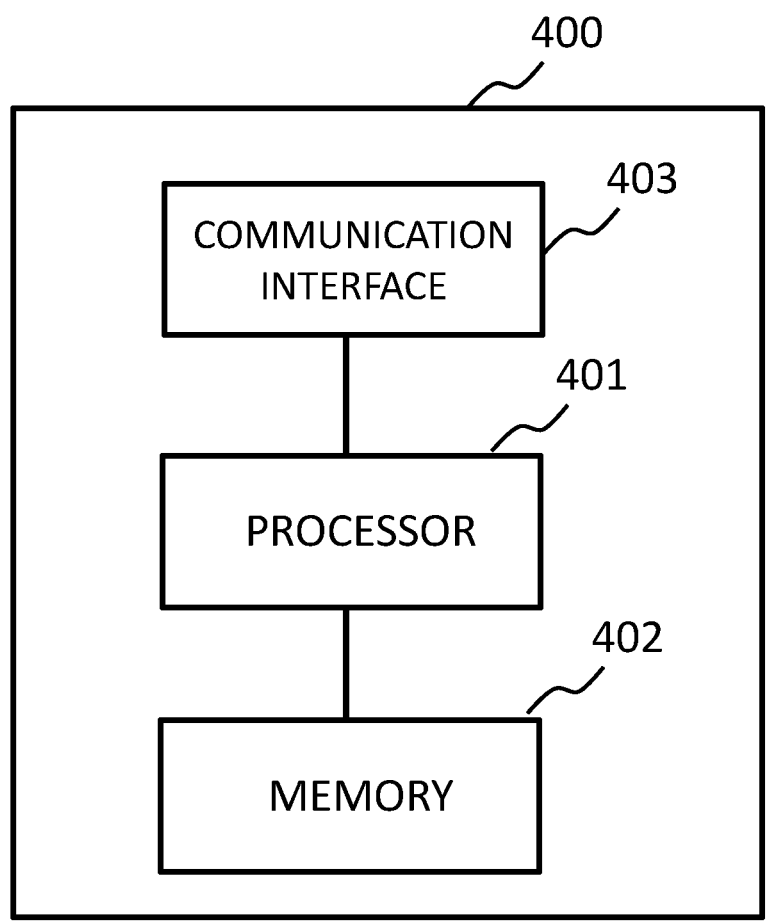
FIG. 12 is a diagram illustrating an example where the wireless apparatus is implemented by a computer apparatus.

At least a part of the processing of each of the wireless apparatuses 20, 40, and 70 in the example first to fourth example embodiments may be implemented in a processor apparatus 400, as schematically illustrated in FIG. 12, for example. Referring to FIG. 12, the processor apparatus 400 includes a processor 401, a memory 402, and a communication interface 403. Though not particularly limited thereto, the processor 401 may include a communication processor such as a baseband processor or a signal processing processor such as a DSP (Digital Signal Processor). The memory 402 may include at least one of a semiconductor memory (such as a RAM (Random Access Memory), a ROM (Read Only Memory) or an EEPROM (Electrically Erasable and Programmable ROM)), an HDD (Hard Disk Drive), a CD (Compact Disc), and a DVD (Digital Versatile Disc). The communication interface 403 may be configured to communicatively connect to the wireless transmission/reception part 202 and receives a baseband signal from the wireless transmission/reception part 202 in FIG. 3, for example. It may be so configured that a program and necessary data for implementing a part or all of respective functional parts of the first weight multiplication part 203, channel estimation part 204, metric computation part 205, beam selection part 206, second weight generation part 207, and the signal detection part 208 of the wireless apparatus 20 in FIG. 3 or each functional part such as the noise path removal part 204 in FIG. 5, for example, are stored in the memory 402 and the processor 401 reads and executes the program to implement a part or all of the functions of the wireless apparatus 20 (40) in each of the example embodiments.

Each disclosure of the above-listed Patent Literature 1 and Non Patent Literature 1 that have been termed is incorporated herein by reference. Modification and adjustment of each example embodiment and each example are possible within the scope of the overall disclosure (including claims) of the present invention and based on the technical concept of the present invention. Various combinations and selections of various disclosed elements (including each element in each supplementary note, each element in each example embodiment and each example, each element in each drawing, and the like) are possible within the scope of the overall disclosure of the present invention. That is, the present invention naturally includes various variations and modifications that could be made by those skilled in the art according to the overall disclosure including the claims and the technical concept. With respect to a numerical value range described herein in particular, an arbitrary numerical value and a small range included in the numerical value range should be construed to be specifically described even unless otherwise explicitly described.

The above-described example embodiments are described as the following supplementary notes (but not limited to the following supplementary notes).

(Supplementary Note 1)

A multi-user MIMO (MU-MIMO)-enabled wireless apparatus comprising:

a channel estimation part that estimates a channel response of a beam associated with each antenna of each wireless terminal;

a metric computation part that computes a predetermined metric for each combination of beams to be used, by using each channel response; and a beam selection part that select the beams to be used when performing signal detection with respect to a received signal into which radio signals respectively transmitted from a plurality of the terminals are obtained by spatially multiplexed, based on the predetermined metric.

(Supplementary Note 2)

A wireless apparatus comprising:

a first weight multiplication part that includes a first weight corresponding to an individual one of a plurality of beams and generates a signal obtained by multiplying, by the first weight, a received signal corresponding to a reference signal transmitted from each of a plurality of wireless terminals;

a channel estimation part that estimates, a channel response associated with an individual one of the plurality of beams, for each of the plurality of wireless terminals, by using the signal obtained by the multiplication by the first weight;

a metric computation part that computes a predetermined metric for each combination of beams to be used, by using the channel response estimated for each wireless terminal with respect to the plurality of wireless terminals;

a beam selection part that selects beams to be used for signal detection of a received signal into which radio signals respectively transmitted from the plurality of wireless terminals are spatially multiplexed, based on the predetermined metric;

a second weight generation part that determine a second weight to be used for the signal detection, by using the channel response associated with each of the selected beams; and a signal detection part that perform the signal detection by multiplying, by the second weight, the received signal into which into which radio signals respectively transmitted from the plurality of wireless terminals are spatially multiplexed.

(Supplementary Note 3)

The wireless apparatus according to Supplementary Note 1 or 2, wherein the metric computation part determines the predetermined metric, based on a signal to interference plus noise power ratio for each of the wireless terminals and for each transmission layer of each of the wireless terminals that has been computed by using the channel response associated with each of the beams to be used.

(Supplementary Note 4)

The wireless apparatus according to Supplementary Note 3, wherein the metric computation part uses, as the predetermined metric, a minimum value of the signal to interference plus noise power ratio that has been computed for each of the wireless terminals and for each transmission layer of each of the wireless terminals.

(Supplementary Note 5)

The wireless apparatus according to Supplementary Note 3, wherein the metric computation part uses, as the predetermined metric, a minimum value of a difference value between the signal to interference plus noise power ratio for each of the wireless terminals and for each transmission layer of each of the wireless terminals, and a signal to interference plus noise power ratio that is necessary for achieving a predetermined error rate in a modulation scheme and a coding rate specified for each of the wireless terminals and for each transmission layer of each of the wireless terminals.

(Supplementary Note 6)

The wireless apparatus according to Supplementary Note 3, wherein the metric computation part uses, as the predetermined metric, a value obtained by totaling, for all the plurality of wireless terminals and all the transmission layers of the respective terminals, an instantaneous transmission rate for each of the wireless terminals and for each transmission layer of each of the terminals that is computed by using the signal to interference plus noise power ratio for each of the wireless terminals and for each transmission layer of each of the wireless terminals.

(Supplementary Note 7)

The wireless apparatus according to Supplementary Note 3, wherein the metric computation part uses, as the predetermined metric, a value obtained by normalizing, by an average transmission rate of each of the wireless terminals, an instantaneous transmission rate for each of the wireless terminals and for each transmission layer of each of the terminals that is computed by using the signal to interference plus power noise ratio and further totaling, for all of the plurality of wireless terminals, the normalized instantaneous transmission rate.

(Supplementary Note 8)

The wireless apparatus according to Supplementary Note 3, wherein the metric computation part determines the predetermined metric, based on a value obtained by totaling, for all the plurality of wireless terminals, received power computed from the channel response associated with each of the plurality of wireless terminals.

(Supplementary Note 9)

The wireless apparatus according to Supplementary Note 2, wherein each of the metric computation part and the second weight generation part does not use, among the channel responses associate with the plurality of beams that are output by the channel estimation part, the channel response whose reception level does not satisfy a predefined threshold value.

(Supplementary Note 10)

The wireless apparatus according to any one of Supplementary Notes 2 to 9, further comprising:

a noise path removal part that receives the channel response associated with each of the plurality of beams from the channel estimation part and updates the channel response whose reception level does not satisfy the predefined threshold value to a channel response including no signal, and then to output the updated channel response to each of the metric computation part and the second weight output part.

(Supplementary Note 11)

The wireless apparatus according to any one of Supplementary 4 to 7, wherein the beam selection part selects the beams that maximizes the predetermined metric computed by the metric computation part.

(Supplementary Note 12)

The wireless apparatus according to any one of Supplementary Notes 2 to 11, wherein the wireless apparatus includes a centralized control unit and a plurality of distributed units each including at least a plurality of antennas and a wireless transmission/reception part, wherein the centralized control unit includes at least the metric computation part, the second weight generation part, and the signal detection part, wherein the first weight multiplication part multiplies, by the first weight, each radio signal received at each of the distributed units; and the metric computation part computes the predetermined metric for each combination of the beams that extend over a plurality of distributed units.

(Supplementary Note 13)

The wireless apparatus according to Supplementary Note 12, wherein each of the distributed units further includes the first weight multiplication part, and the center part further includes the channel estimation part.

(Supplementary Note 14)

The wireless apparatus according to Supplementary Note 12, wherein the centralized control unit further includes a noise path removal part that receives the channel response associated with each of the plurality of beams from the channel estimation part and update the channel response whose reception level does not satisfy the predefined threshold value to the channel response including no signal, and then to output the updated channel response to each of the metric computation part and the second weight output part.

(Supplementary Note 15)

The wireless apparatus according to Supplementary Note 12, wherein each of the distributed units further includes the first weight multiplication part, the channel estimation part, and the beam selection part.

(Supplementary Note 16)

The wireless apparatus according to Supplementary Note 12, wherein each of the distributed units further includes a noise path removal part that receives the channel response associated with each of the plurality of beams from the channel estimation part and update the channel response whose reception level does not satisfy the predefined threshold value to the channel response including no signal, and then to output the updated channel response to each of the metric computation part and the second weight output part.

(Supplementary Note 17)

The wireless apparatus according to any one of Supplementary Note 1 to 16, further comprising:

a scheduler part that performs scheduling for allocating radio resources to each of the terminals;

wherein the scheduler part determines a combination of the wireless terminals (the wireless terminals to be spatially multiplexed over the same radio resources) for which the scheduling is to be performed, based on the metric for each combination of the beams to be used that is computed by the metric computation part.

(Supplementary Note 18)

A wireless communication method by a multi-user MIMO (MU-MIMO)-enabled wireless apparatus comprising:

estimating a channel response of a beam associated with each antenna of each wireless terminal;

computing a predetermined metric for each combination of beams to be used, by using each channel response; and selecting the beams to be used when performing signal detection with respect to a received signal into which radio signals respectively transmitted from a plurality of the terminals are spatially multiplexed, based on the predetermined metric.

(Supplementary Note 19)

A wireless communication method comprising:

including a first weight corresponding to each of a plurality of beams and multiplying, by the first weight, a received signal corresponding to a reference signal transmitted from each of a plurality of wireless terminals;

estimating a channel response associated with each of the plurality of beams, for each of the plurality of wireless terminals, by using the signal obtained by the multiplication by the first weight;

computing a predetermined metric for each combination of beams to be used, by using the channel response estimated for each wireless terminal with respect to the plurality of wireless terminals;

selecting beams to be used for signal detection of a received signal into which radio signals respectively transmitted from the plurality of wireless terminals are spatially multiplexed, based on the predetermined metric;

determining a second weight to be used for the signal detection, by using the channel response associated with each of the selected beams; and performing the signal detection by multiplying, by the second weight, the received signal into which into which radio signals respectively transmitted from the plurality of wireless terminals are spatially multiplexed.

(Supplementary Note 20)

The wireless communication method according to Supplementary Note 19, comprising determining the predetermined metric, based on a signal to interference plus noise power ratio for each of the wireless terminals and for each transmission layer of each of the wireless terminals that has been computed by using the channel response associated with each of the beams to be used.

(Supplementary Note 21)

The wireless communication method according to Supplementary Note 20, comprising using, as the predetermined metric, a minimum value of the signal to interference plus noise power ratio that has been computed for each of the wireless terminals and for each transmission layer of each of the wireless terminals.

(Supplementary Note 22)

The wireless communication method according to Supplementary Note 20, comprising using, as the predetermined metric, a minimum value of a difference value between the signal to interference plus noise power ratio for each of the wireless terminals and for each transmission layer of each of the wireless terminals, and a signal to interference plus noise power ratio that is necessary for achieving a predetermined error rate in a modulation scheme and a coding rate specified for each of the wireless terminals and for each transmission layer of each of the wireless terminals.

(Supplementary Note 23)

The wireless communication method according to Supplementary Note 20, comprising using, as the predetermined metric, a value obtained by totaling, for all the plurality of wireless terminals and all the transmission layers of the respective terminals, an instantaneous transmission rate for each of the wireless terminals and for each transmission layer of each of the terminals that is computed by using the signal to interference plus noise power ratio for each of the wireless terminals and for each transmission layer of each of the wireless terminals.

(Supplementary Note 24)

The wireless communication method according to Supplementary Note 20, comprising using, as the predetermined metric, a value obtained by normalizing, by an average transmission rate of each of the wireless terminals, an instantaneous transmission rate for each of the wireless terminals and for each transmission layer of each of the terminals that is computed by using the signal to interference plus power noise ratio and further totaling, for all of the plurality of wireless terminals, the normalized instantaneous transmission rate.

(Supplementary Note 25)

The wireless communication method according to Supplementary Note 20, comprising determining the predetermined metric, based on a value obtained by totaling, for all the plurality of wireless terminals, received power computed from the channel response associated with each of the plurality of wireless terminals.

(Supplementary Note 26)

The wireless communication method according to Supplementary Note 19, comprising not using the channel response whose reception level does not satisfy a predefined threshold value, among the channel responses associated with the plurality of beams.

(Supplementary Note 27)

The wireless communication method according to any one of Supplementary Notes 19 to 26, comprising receiving the channel response associated with each of the plurality of beams, updating the channel response whose reception level does not satisfy the predefined threshold value to a channel response including no signal, and then outputting the updated channel response.

(Supplementary Note 28)

The wireless communication method according to any one of Supplementary Notes 21 to 24, comprising selecting the beams that maximize the predetermined metric that has been computed.

(Supplementary Note 29)

The wireless communication method according to any one of Supplementary Notes 19 to 28, comprising determining a combination of the wireless terminals (the wireless terminals to be spatially multiplexed over the same radio resources) for which the scheduling is to be performed, based on the metric for each combination of the beams to be used.

(Supplementary Note 30)

A program that cause a computer comprising a multi-user MIMO-enabled wireless apparatus to execute the processes of:

estimating a channel response of a beam associated with each antenna of each wireless terminal;

computing a predetermined metric for each combination of beams to be used, by using each channel response; and selecting the beams to be used when performing signal detection with respect to a received signal into which radio signals respectively transmitted from a plurality of the terminals are spatially multiplexed, based on the predetermined metric.

(Supplementary Note 31)

A program that cause a computer comprising a wireless apparatus to execute:

a first weight multiplication process of including a first weight corresponding to each of a plurality of beams and multiplying, by the first weight, a received signal corresponding to a reference signal transmitted from each of a plurality of wireless terminals;

a channel estimation process of estimating a channel response associated with each of the plurality of beams for each of the plurality of wireless terminals, by using the signal obtained by the multiplication by the first weight;

a metric computation process of computing a predetermined metric for each combination of the beams to be used, by using the channel response estimated for each wireless terminal with respect to the plurality of wireless terminals;

a beam selection process of selecting the beams to be used when performing signal detection with respect to a received signal obtained by spatial multiplexing of radio signals respectively transmitted from the plurality of wireless terminals, based on the predetermined metric;

a second weight generation process of determining a second weight to be used for the signal detection, by using the channel response associated with each of the selected beams; and a signal detection process of performing the signal detection by multiplying, by the second weight, the received signal obtained by the spatial multiplexing of the radio signals from the plurality of wireless terminals.

(Supplementary Note 32)

The program according to Supplementary Note 31, wherein in the metric computation process, the predetermined metric is computed, based on a signal to interference plus noise power ratio for each of the wireless terminals and for each transmission layer of each of the wireless terminals that has been computed by using the channel response associated with each of the beams to be used.

(Supplementary Note 33)

The program according to Supplementary Note 32, wherein in the metric computation process, a minimum value of the signal to interference plus noise power ratio that has been computed for each of the wireless terminals and for each transmission layer of each of the wireless terminals is used as the predetermined metric.

(Supplementary Note 34)

The program according to Supplementary Note 32, wherein the metric computation process uses, as the predetermined metric, a minimum value of a difference value between the signal to interference plus noise power ratio that is computed for each of the wireless terminals and for each transmission layer of each of the wireless terminals, and a signal to interference plus noise power ratio that is necessary for achieving a predetermined error rate in a modulation scheme and a coding rate specified for each of the wireless terminals and for each transmission layer of each of the wireless terminals.

(Supplementary Note 35)

The program according to Supplementary Note 32, wherein the metric computation process uses, as the predetermined metric, a value obtained by totaling, for all the plurality of wireless terminals and all the transmission layers of the respective terminals, an instantaneous transmission rate for each of the wireless terminals and for each transmission layer of each of the terminals that is computed by using the signal to interference plus noise power ratio for each of the wireless terminals and for each transmission layer of each of the wireless terminals.

(Supplementary Note 36)

The program according to Supplementary Note 32, wherein the metric computation process uses, as the predetermined metric, a value obtained by normalizing, by an average transmission rate of each of the wireless terminals, an instantaneous transmission rate for each of the wireless terminals and for each transmission layer of each of the wireless terminals that is computed by using the signal to interference plus power noise ratio and further totaling, for all of the plurality of wireless terminals, the instantaneous transmission rate.

(Supplementary Note 37)

The program according to Supplementary Note 31, wherein in the metric computation process, the predetermined metric is determined, based on a value obtained by totaling, for all the plurality of wireless terminals, received power computed from the channel response associated with each of the wireless terminals.

(Supplementary Note 38)

The program according to Supplementary Note 31, wherein in each the metric computation process and the second weight generation process, the channel response whose reception level does not satisfy a predefined threshold value is not used, among the channel response associated with each of the plurality of beams that is output in the channel estimation process.

(Supplementary Note 39)

The program according to any one of Supplementary Notes 31 to 38, further causing the computer to execute a noise path removal process of receiving, from the channel estimation process, the channel response associated with each of the plurality of beams, updating the channel response whose reception level does not satisfy the predefined threshold value to a channel response including no signal, and then outputting the updated channel response to each of the metric computation process and the second weight generation process.

(Supplementary Note 40)

The program according to any one of Supplementary Notes 33 to 36, wherein the beam selection process selects the beams that maximize the predetermined metric that has been computed in the metric computation process.

(Supplementary Note 41)

The program according to any one of Supplementary Notes 31 to 40, wherein in the first weight multiplication process of a centralized control unit connected to a plurality of distributed units each including at least a plurality of antennas and a wireless transmitting/receiving process, each radio signal received at each of the distributed units is multiplied by the first weight; and in the metric computation process of the centralized control unit, the predetermined metric is computed for each computation of the beams that extend over the plurality of distributed units.

(Supplementary Note 42)

The program according to any one of Supplementary Notes 31 to 41, further causing the computer to execute a scheduler process of performing scheduling for allocating radio resources to each of the plurality of wireless terminals, wherein a combination of the wireless terminals (wireless terminals to be spatially multiplexed over same radio resources) for which the scheduling is to be performed is determined, based on the metric for each combination of the beams to be used that is computed in the metric computation process.

What is claimed is:

1. A wireless apparatus comprising:
at least a processor; and
a memory in circuit communication with the processor,
wherein the processor is configured to execute program instructions stored in the memory to implement:
a first weight multiplication part that includes a first weight corresponding to an individual one of a plurality of beams and generates a signal obtained by multiplying, by the first weight, a received signal corresponding to a reference signal transmitted from each of a plurality of wireless terminals;
a channel estimation part that estimates, a channel response associated with an individual one of the plurality of beams, for each of the plurality of wireless terminals, by using the signal obtained by the multiplication by the first weight;
a metric computation part that computes a predetermined metric for each combination of beams to be used, by using the channel response estimated for each wireless terminal with respect to the plurality of wireless terminals;
a beam selection part that selects beams to be used for signal detection of a received signal into which radio signals respectively transmitted from the plurality of wireless terminals are spatially multiplexed, based on the predetermined metric;
a second weight generation part that determines a second weight to be used for the signal detection, by using the channel response associated with each of the selected beams; and
a signal detection part that performs the signal detection by multiplying, by the second weight, the received signal into which radio signals respectively transmitted from the plurality of wireless terminals are spatially multiplexed.

2. The wireless apparatus according to claim 1, wherein the metric computation part determines the predetermined metric, based on signal to interference plus noise power ratios, each computed for each of the wireless terminals and for each transmission layer of the each of the wireless terminals, by using the channel response associated with each of the beams to be used.

3. The wireless apparatus according to claim 2, wherein the metric computation part uses, as the predetermined metric, a minimum value of the signal to interference plus noise power ratios computed for each of the wireless terminals and for each transmission layer of the each of the wireless terminals.

4. The wireless apparatus according to claim 2, wherein the metric computation part uses, as the predetermined metric, a minimum value of a difference value between the signal to interference plus noise power ratio for each of the wireless terminals and for each transmission layer of the each of the wireless terminals, and a signal to interference plus noise power ratio necessary for achieving a predetermined error rate in a modulation scheme and a coding rate specified for each of the wireless terminals and for each transmission layer of each of the wireless terminals.

5. The wireless apparatus according to claim 2, wherein the metric computation part uses, as the predetermined metric, a value obtained by totaling, for all the plurality of wireless terminals and for all the transmission layers of each of the plurality of wireless terminals, each instantaneous transmission rate for each of the wireless terminals and for each transmission layer of each of the wireless terminals, the each instantaneous transmission rate computed by using the each signal to interference plus noise power ratio for each of the wireless terminals and for each transmission layer of each of the wireless terminals.

6. The wireless apparatus according to claim 2, wherein the metric computation part uses, as the predetermined metric, a value obtained by normalizing, by an average transmission rate of each of the wireless terminals, an instantaneous transmission rate for each of the wireless terminals and for each transmission layer of each of the wireless terminals, the instantaneous transmission rate computed by using the signal to interference plus power noise ratio and further totaling, for all of the plurality of wireless terminals, the normalized instantaneous transmission rate.

7. The wireless apparatus according to claim 2, wherein the metric computation part determines the predetermined metric, based on a value obtained by totaling, for all the plurality of wireless terminals, received power computed based on the channel response associated with each of the plurality of wireless terminals.

8. The wireless apparatus according to claim 1, wherein the processor is configured to execute the program instructions stored in the memory to implement
a noise path removal part that receives the channel response associated with each of the plurality of beams from the channel estimation part and updates the channel response whose reception level does not satisfy a predefined threshold value to a channel response including no signal, and then outputs the updated channel response to each of the metric computation part and the second weight output part.

9. The wireless apparatus according to claim 1, wherein the wireless apparatus includes:
a centralized control unit; and
a plurality of distributed units, each including at least a plurality of antennas and a wireless transmission/reception part, wherein
the centralized control unit includes at least the metric computation part, the second weight generation part, and the signal detection part;
the first weight multiplication part multiplies, by the first weight, each radio signal received at each of the distributed units; and
the metric computation part computes the predetermined metric for each combination of the beams that extend over the plurality of distributed units.

10. The wireless apparatus according to claim 1, wherein the processor is configured to execute the program instructions stored in the memory to implement a scheduler part that perform scheduling for allocating radio resources to each of the plurality of wireless terminals,
wherein the scheduler part determines a combination of the wireless terminals for which the scheduling is to be performed, based on the metric for each combination of the beams to be used that is computed by the metric computation part.

11. The wireless apparatus according to claim 3, wherein the beams selected by the beam selection part include beams that maximize the predetermined metric computed by the metric computation part.

12. The wireless apparatus according to claim 2, comprising
N antennas, wherein
the first weight multiplication part executes the multiplication of the received signal by the first weight, by calculating an inner product of an N dimensional first weight vector for each beam and an N dimensional received signal vector having, as N elements, N signals received respectively at the N antennas, the first weight multiplication part calculating the inner product for B beams, where B is total number of the beams, to obtain B-dimensional received signal vector, and
wherein the channel estimation part that estimates the channel response $q_{k,m,b}$ associated with b-th beam where b is an integer from 1 to B, and m-th antenna of k-th wireless terminal where m is an integer from 1 to M where M is the number of antennas of the wireless terminal and k is an integer from 1 to K where K is the number of the wireless terminals.

13. The wireless apparatus according to claim 12, wherein the metric computation part multiplies the B-dimensional received signal vector by a beam selection matrix U of B rows and B' (where B'<B) columns which is made up of B' number of B dimensional column vector $u_{n(i)}$, where i is an integer from 1 to B', the B dimensional column vector $u_{n(b')}$ where n(b') indicates a beam number for the beam to be selected b'-th, the vector $u_{n(b')}$ having 1 at only n(b')-th element and o at remaining elements, to obtain a B'-dimensional received signal,
finds a weight vector $w_{k,l}$ for l-th transmission layer of k-th wireless terminal based on the B'-dimensional received signal,
calculates using the weight vector $w_{k,l}$, a signal to interference plus noise power ratio (SINR) $\gamma_{k,l}(U)$, for k-th wireless terminal and for l-th transmission layer, where U is the beam selection matrix, and
calculates the predetermined metric, by applying a predetermined operation regarding the signal to interference plus noise power ratio (SINR) $\gamma_{k,l}(U)$, for k from 1 to K, and for l from 1 to L.

14. The wireless apparatus according to claim 13, wherein the beam selection part selects the beam selection matrix U that maximizes the predetermined metric.

15. A wireless communication method by a wireless apparatus comprising:
including a first weight corresponding to each of a plurality of beams and multiplying, by the first weight, a received signal corresponding to a reference signal transmitted from each of a plurality of wireless terminals;
estimating a channel response associated with each of the plurality of beams, for each of the plurality of wireless terminals, by using the signal obtained by the multiplication by the first weight;

computing a predetermined metric for each combination of beams to be used, by using the channel response estimated for each wireless terminal with respect to the plurality of wireless terminals;

selecting beams to be used for signal detection of a received signal into which radio signals respectively transmitted from the plurality of wireless terminals are spatially multiplexed, based on the predetermined metric;

determining a second weight to be used for the signal detection, by using the channel response associated with each of the selected beams; and performing the signal detection by multiplying, by the second weight, the received signal into which radio signals respectively transmitted from the plurality of wireless terminals are spatially multiplexed.

16. The wireless communication method according to claim 15, comprising determining the predetermined metric, based on signal to interference plus noise power ratios, each computed for each of the wireless terminals and for each transmission layer of the each of the wireless terminals, by using the channel response associated with each of the beams to be used.

17. The wireless communication method according to claim 16, comprising using, as the predetermined metric, a minimum value of the signal to interference plus noise power ratios computed for each of the wireless terminals and for each transmission layer of the each of the wireless terminals.

18. The wireless communication method according to claim 16, comprising using, as the predetermined metric, a minimum value of a difference value between the signal to interference plus noise power ratio for each of the wireless terminals and for each transmission layer of the each of the wireless terminals, and a signal to interference plus noise power ratio necessary for achieving a predetermined error rate in a modulation scheme and a coding rate specified for each of the wireless terminals and for each transmission layer of each of the wireless terminals.

19. The wireless communication method according to claim 16, comprising performing scheduling for allocating radio resources to each of the plurality of wireless terminals, wherein the scheduling determines a combination of the wireless terminals for which the scheduling is to be performed, based on the computed metric for each combination of the beams to be used.

20. A non-transitory computer readable storage medium storing a program that cause a computer to execute processing comprising:

including a first weight corresponding to each of a plurality of beams and multiplying, by the first weight, a received signal corresponding to a reference signal transmitted from each of a plurality of wireless terminals;

estimating a channel response associated with each of the plurality of beams, for each of the plurality of wireless terminals, by using the signal obtained by the multiplication by the first weight;

computing a predetermined metric for each combination of beams to be used, by using the channel response estimated for each wireless terminal with respect to the plurality of wireless terminals;

selecting beams to be used for signal detection of a received signal into which radio signals respectively transmitted from the plurality of wireless terminals are spatially multiplexed, based on the predetermined metric;

determining a second weight to be used for the signal detection, by using the channel response associated with each of the selected beams; and performing the signal detection by multiplying, by the second weight, the received signal into which radio signals respectively transmitted from the plurality of wireless terminals are spatially multiplexed.

* * * * *